(12) United States Patent
Saitoh et al.

(10) Patent No.: US 12,117,711 B2
(45) Date of Patent: *Oct. 15, 2024

(54) LIGHT DEFLECTION DEVICE AND OPTICAL DEVICE

(71) Applicant: FUJIFILM Corporation, Tokyo (JP)

(72) Inventors: Yukito Saitoh, Minami-ashigara (JP); Hiroshi Sato, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/173,633

(22) Filed: Feb. 23, 2023

(65) Prior Publication Data
US 2023/0194948 A1    Jun. 22, 2023

Related U.S. Application Data

(60) Division of application No. 17/034,625, filed on Sep. 28, 2020, now Pat. No. 11,609,476, which is a (Continued)

(30) Foreign Application Priority Data

| Mar. 29, 2018 | (JP) | 2018-063851 |
| Jul. 27, 2018 | (JP) | 2018-141340 |
| Sep. 28, 2018 | (JP) | 2018-184467 |

(51) Int. Cl.
*G02F 1/29* (2006.01)
*G02F 1/1335* (2006.01)
(Continued)

(52) U.S. Cl.
CPC .......... *G02F 1/29* (2013.01); *G02F 1/133504* (2013.01); *G02F 1/133757* (2021.01);
(Continued)

(58) Field of Classification Search
None
See application file for complete search history.

(56) References Cited

U.S. PATENT DOCUMENTS

| 5,648,859 A | 7/1997 | Hirabayashi et al. |
| 2002/0060659 A1* | 5/2002 | Matsuda ................ G02B 30/34 |
| | | 345/94 |

(Continued)

FOREIGN PATENT DOCUMENTS

| JP | 62-250410 A | 10/1987 |
| JP | 62-250427 A | 10/1987 |

(Continued)

OTHER PUBLICATIONS

English translation of the International Search Report, dated Jun. 25, 2019, for International Application No. PCT/JP2019/013832.
(Continued)

*Primary Examiner* — Paisley L Wilson
(74) *Attorney, Agent, or Firm* — Birch, Stewart, Kolasch & Birch, LLP

(57) ABSTRACT

An object of the present invention is to provide a light deflection device having a simple structure suitable for reducing the size and weight where a deflection angle can be increased. The object can be achieved with a light deflection device including: a light deflection element that deflects incident light in one direct to be emitted; a driving unit that drives the light deflection element; and a diffraction element that is disposed on a light emission side of the light deflection element in which a periodic structure pitch gradually changes from a center of deflection from the light deflection element toward an outside.

8 Claims, 13 Drawing Sheets

Related U.S. Application Data continuation of application No. PCT/JP2019/013832, filed on Mar. 28, 2019.

(51) Int. Cl.
*G02F 1/1337* (2006.01)
*G02B 5/30* (2006.01)
*G02F 1/1347* (2006.01)

(52) U.S. Cl.
CPC ............ *G02F 1/291* (2021.01); *G02B 5/3016* (2013.01); *G02F 1/13471* (2013.01)

(56) References Cited

U.S. PATENT DOCUMENTS

| | | |
|---|---|---|
| 2003/0179426 A1 | 9/2003 | Ide |
| 2010/0225876 A1 | 9/2010 | Escuti et al. |
| 2012/0188467 A1 | 7/2012 | Escuti et al. |
| 2013/0027656 A1 | 1/2013 | Escuti et al. |
| 2013/0155337 A1 | 1/2013 | Sugiyama et al. |
| 2015/0205182 A1 | 7/2015 | Leister |
| 2016/0011353 A1 | 1/2016 | Escuti et al. |

FOREIGN PATENT DOCUMENTS

| | | |
|---|---|---|
| JP | 2-181124 A | 7/1990 |
| JP | 6-194895 A | 7/1994 |
| JP | 7-92507 A | 4/1995 |
| JP | 2000-75229 A | 3/2000 |
| JP | 2003-295153 A | 10/2003 |
| JP | 2005-274847 A | 10/2005 |
| JP | 2010-525394 A | 7/2010 |
| JP | 2014-528597 A | 10/2014 |
| JP | 2017-111277 A | 6/2017 |
| WO | WO 2013/014875 A1 | 1/2013 |

OTHER PUBLICATIONS

International Preliminary Report on Patentability and Written Opinion of the International Searching Authority, dated Oct. 8, 2020, for International Application No. PCT/JP2019/013832, with English translation.

Japanese Office Action for Japanese Application No. 2020-511042, dated Sep. 7, 2021, with English translation.

Non Final Office Action for U.S. Appl. No. 17/034,625, dated Aug. 16, 2022.

Notice of Allowance for U.S. Appl. No. 17/034,625, dated Jan. 5, 2023.

\* cited by examiner

LIGHT DEFLECTION DEVICE AND OPTICAL DEVICE

CROSS-REFERENCE TO RELATED APPLICATIONS

This application is a Divisional of co-pending U.S. patent application Ser. No. 17/034,625, filed on Sep. 28, 2020, which is a Continuation of PCT International Application No. PCT/JP2019/013832 filed on Mar. 28, 2019, which claims priority under 35 U.S.C. § 119(a) to Japanese Patent Application No. 2018-063851 filed on Mar. 29, 2018, Japanese Patent Application No. 2018-141340 filed on Jul. 27, 2018 and Japanese Patent Application No. 2018-184467 filed on Sep. 28, 2018. Each of the above applications is hereby expressly incorporated by reference, in its entirety, into the present application.

BACKGROUND OF THE INVENTION

1. Field of the Invention

The present invention relates to a light deflection device having a simple structure suitable for reducing the size and weight where a deflection angle can be increased, and an optical device including the light deflection device.

2. Description of the Related Art

Currently, a laser light deflection technique is applied to various fields. Examples of the light deflection technique include an aberration correction system for free-space optical communication and a scanning system for laser radar.

In the related art, as a laser light deflector or a pointing optical system, for example, a gimbal mirror or a galvanometer mirror has been widely used. These methods are direct and simple methods because the mirror is mechanically moved to control a direction of laser light.

In addition, as a configuration of the light deflector, a configuration in which the deflection angle is extended using a liquid crystal prism including a liquid crystal layer having a prism shape is also known.

As techniques of the related art relating to the liquid crystal prism, for example, techniques described in JP1994-194695A (JP-H6-194695A) and JP1995-092507A (JP-H7-092507A), and a technique (for example, P2003-295153A) of combining a liquid crystal layer and a wedge-shaped prism are present.

SUMMARY OF THE INVENTION

However, in the method of the related art, it is necessary to control a relatively large mirror along with a large physical operation. Therefore, there is a problem in that the method is not suitable for a system requiring a reduction in size and weight or for a use requiring low power consumption.

In addition, the liquid crystal prism including a liquid crystal layer having a prism shape has a problem in that the manufacturing process is complicated and the control is difficult.

Further, in a method of using a wedge-shaped prism as liquid crystal, it is necessary that the wedge-shaped prism has a thickness to some extent, and there is a problem in that this method is not necessarily suitable in a case where a reduction in weight and size is required.

An object of the present invention is to solve the problems of the related art and to provide: a light deflection device having a simple structure suitable for reducing the size and weight where a deflection angle can be increased, and an optical device including the light deflection device.

In order to achieve the object, a light deflection device according to the present invention has the following configurations.

[1] A light deflection device comprising:
a light deflection element that deflects incident light to be emitted;
a driving unit that drives the light deflection element; and
a diffraction element that is disposed on a light emission side of the light deflection element in which a periodic structure pitch gradually changes from a center of deflection from the light deflection element toward an outside.

[2] The light deflection device according to [1],
in which the light deflection element is a liquid crystal optical phase modulation element.

[3] The light deflection device according to [1],
in which the light deflection element is a MEMS light deflection element.

[4] The light deflection device according to any one of [1] to [3],
in which the diffraction element is a liquid crystal diffraction element.

[5] The light deflection device according to [4],
in which the liquid crystal diffraction element includes an optically-anisotropic layer that is formed using a composition including a liquid crystal compound and has a liquid crystal alignment pattern in which a direction of an optical axis derived from the liquid crystal compound changes while continuously rotating in at least one in-plane direction.

[6] The light deflection device according to [5],
in which the liquid crystal alignment pattern of the optically-anisotropic layer is a concentric circular pattern having a concentric circular shape where the in-plane direction in which the direction of the optical axis derived from the liquid crystal compound changes while continuously rotating moves from an inside toward an outside.

[7] The light deflection device according to [5] or [6],
in which the optically-anisotropic layer includes a liquid crystal compound that is twisted and aligned along a helical axis extending in a thickness direction.

[8] The light deflection device according to [7],
in which the liquid crystal diffraction element includes two optically-anisotropic layers having opposite twisted directions in which the liquid crystal compound is twisted and aligned along a helical axis extending in a thickness direction.

[9] The light deflection device according to [8],
in which the optically-anisotropic layer in which the liquid crystal compound is not twisted and aligned is provided between the two optically-anisotropic layers.

[10] The light deflection device according to any one of [4] to [9], comprising:
a $\lambda/4$ plate.

[11] The light deflection device according to [10],
in which the $\lambda/4$ plate is provided between the light deflection element and the liquid crystal diffraction element.

[12] The light deflection device according to any one of [1] to [3],
in which the diffraction element is a hologram diffraction element.

[13] The light deflection device according to any one of [1] to [3],
in which the diffraction element is a surface relief diffraction element.

[14] The light deflection device according to any one of [1] to [3],
in which the diffraction element includes a transparent substrate that is formed of an inorganic material and an uneven pattern that is formed of a plurality of protrusions.

[15] The light deflection device according to any one of [1] to [14], comprising:
a light collecting element that is provided upstream of the diffraction element in a light traveling direction.

[16] The light deflection device according to [15],
wherein the light collecting element is provided upstream of the light deflection element in the light traveling direction.

[17] An optical device comprising:
the light deflection device according to any one of [1] to [16];
a light source that emits light to the light deflection element of the light deflection device; and
a light-receiving element.

According to an aspect of the present invention, it is possible to provide a light deflection device having a simple structure suitable for reducing the size and weight where a deflection angle can be increased, and an optical device including the light deflection device.

DESCRIPTION OF THE PREFERRED EMBODIMENTS

Hereinafter, a light deflection device according to an embodiment of the present invention will be described with reference to the drawings.

In each of the drawings, for easy visual recognition, the reduced scale of components is different from the actual scale.

In the present specification, numerical ranges represented by "to" include numerical values before and after "to" as lower limit values and upper limit values.

In addition, "perpendicular" or "parallel" regarding an angle represents a range of the exact angle±10°.

In the present specification, Re(λ) represents an in-plane retardation at a wavelength λ. Unless specified otherwise, the wavelength λ refers to 550 nm.

In the present specification, Re(λ) is a value measured at the wavelength λ using AxoScan (manufactured by Axometrics, Inc.). By inputting an average refractive index ((nx+ny+nz)/3) and a thickness (d (μm)) to AxoScan, the following expressions can be calculated.

$Re(\lambda)=R0(\lambda)$    Slow Axis Direction (°)

R0(λ) is expressed as a numerical value calculated by AxoScan and represents Re(λ).

(Light Deflection Device)

A configuration of the light deflection device according to the embodiment of the present invention will be described using conceptual diagrams of FIGS. 1 to 3.

Figure 1:
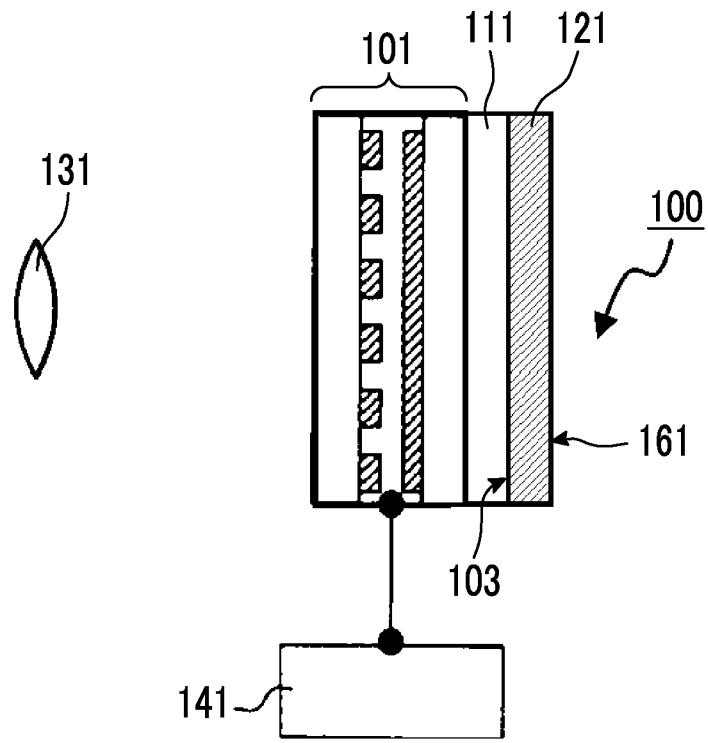
FIG. 1 is a conceptual diagram showing an example of a light deflection device according to the present invention.

As shown in FIG. 1, a light deflection device 100 according to the embodiment of the present invention includes a collecting lens 131, a liquid crystal optical phase modulation element 101, a λ/4 plate 111, and a liquid crystal diffraction element 121 in order from the upstream side in a traveling direction of light (light beam). The liquid crystal optical phase modulation element 101 is the light deflection element according to the embodiment of the present invention and is connected to a drive unit 141.

In the following description, the upstream and the downstream refer to the upstream and the downstream in the light traveling direction.

The λ/4 plate 111 and the liquid crystal diffraction element 121 are disposed on an emission side (downstream) of the liquid crystal optical phase modulation element 101 as shown in FIG. 1.

The liquid crystal optical phase modulation element 101, the λ/4 plate 111, and the liquid crystal diffraction element 121 may be disposed in contact with each other as shown in FIG. 1, and may be further fixed using an adhesive or the like.

Figure 2:
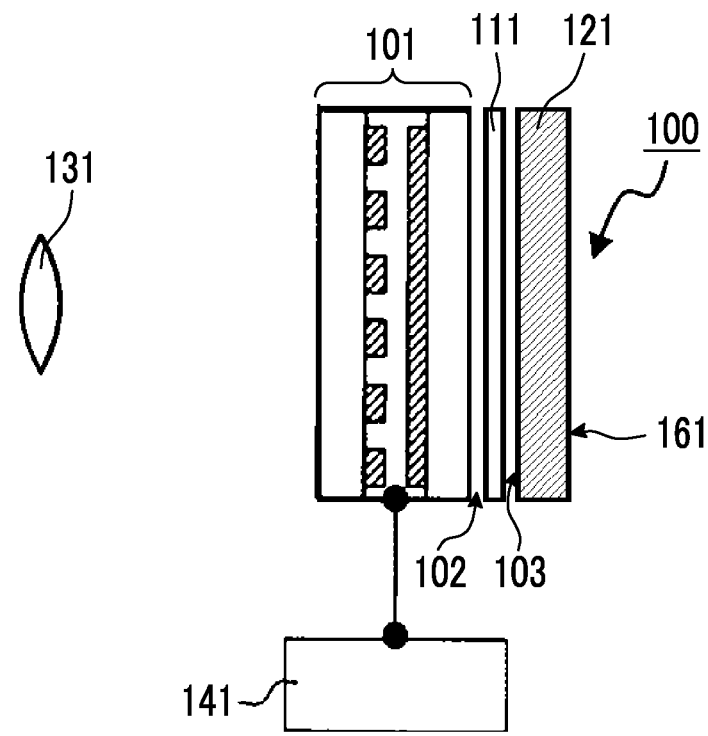
FIG. 2 is a conceptual diagram showing another example of the light deflection device according to the present invention.

In addition, even in a case where the liquid crystal optical phase modulation element 101, the λ/4 plate 111, and the liquid crystal diffraction element 121 are disposed to be spaced at an interval 102 such that they do not deviate from a deflection angle of light emitted from the liquid crystal optical phase modulation element 101 as shown in FIG. 2, the same effects as those of the present invention can be obtained.

Depending on the kind of the light, the light may generate heat during passing. By providing the interval 102, a problem caused in a case where the heat generated from the light during passing melts the adhesive or the like used for fixing the liquid crystal optical phase modulation element 101 and the λ/4 plate 111 and fixing the λ/4 plate 111 and the liquid crystal diffraction element 121 can be avoided. The interval 102 is preferably 0.1 to 30 mm.

In a case where the interval 102 is provided, an incidence surface 103 of the liquid crystal diffraction element 121 is in contact with an air layer. Therefore, optionally, a non-reflective coating may be formed on an emission surface 161 or the incidence surface 103.

Figure 3:
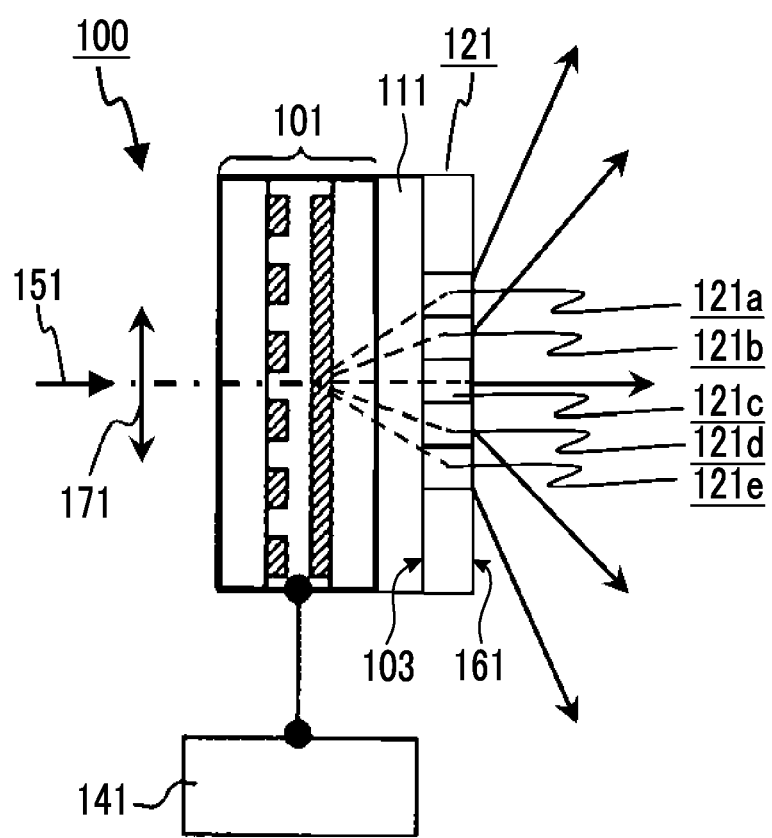
FIG. 3 is a conceptual diagram showing an action of the light deflection device shown in FIG. 1.

FIG. 3 is a conceptual diagram showing an action of the light deflection device 100 according to the embodiment of the present invention.

As shown in FIG. 3, the liquid crystal optical phase modulation element 101 deflects incidence light 151 emitted from a light source (not shown) by a predetermined angle±θ (refer to a broken line).

The incidence light 151 is linearly polarized light in a direction indicated by an arrow 171 in the drawing. This linearly polarized light is P polarized light with respect to the emission surface 161 of the liquid crystal diffraction element 121 in a direction parallel to the cross-sectional view shown in FIG. 3.

In the present invention, S polarized light may be used as the incidence light 151. This configuration can be handled by changing a part of the configuration of the liquid crystal optical phase modulation element 101.

The light deflected from the liquid crystal optical phase modulation element 101 is diffracted by the liquid crystal diffraction element 121 such that the deflection angle is extended.

In FIG. 3, a case where an angle θ of deflection from the liquid crystal optical phase modulation element 101 is a counterclockwise direction is set as a positive direction, and a maximum value in a variable range of the angle θ in the liquid crystal optical phase modulation element 101 is set as a maximum deflection angle θmax. In the light deflection device 100 according to the embodiment of the present invention, a periodic structure pitch (rotation period p described below) in an optically-anisotropic layer 14 of the liquid crystal diffraction element 121 described below is determined such that, in a case where light having the maximum deflection angle θmax is incident into the liquid crystal diffraction element 121, an emission angle is a desired maximum emission angle θmaxout in the light deflection device 10.

As a result, even in a case where the maximum deflection angle θmax of the liquid crystal optical phase modulation element 101 decreases, the maximum deflection angle θmax of the liquid crystal optical phase modulation element 101 can be extended to the desired maximum emission angle θmaxout in the light deflection device 10 by the liquid crystal diffraction element 121.

Likewise, even in a case where the angle θ is a negative direction, that is, a clockwise direction, by determining the periodic structure pitch such that the emission angle at the maximum deflection angle θmax as the maximum value in a variable range of the angle θ is the desired maximum emission angle θmaxout in the light deflection device 10, the maximum deflection angle θmax can be extended to the desired maximum emission angle θmaxout.

Although described in detail below, in the liquid crystal diffraction element 121, as the periodic structure pitch decreases, the diffraction angle increases. In addition, in the light deflection device 100, in order to increase the deflection angle of emitted light, the diffraction angle of the liquid crystal diffraction element 121 gradually decreases from the center of deflection (deflection orientation) from the liquid crystal optical phase modulation element 101 toward the outside (both end portions).

This implies that a relationship of pa<pb<pc is satisfied, where pa, pb, and pc represent periodic structure pitches (rotation periods p) of regions 121a, 121b, and 121c of the liquid crystal diffraction element 121, respectively. Likewise, a relationship of pe<pd<pc is satisfied, where pd and pe represent periodic structure pitches of regions 121d and 121e, respectively.

This way, in a case where the absolute value of the angle θ is between 0 and the maximum deflection angle θmax and the angle θ of light emitted from the liquid crystal optical phase modulation element 101 is small, the periodic structure pitch is set to be large such that the light is slightly diffracted in the liquid crystal diffraction element 121. In addition, the angle θ of light emitted from the liquid crystal optical phase modulation element 101 approaches the maximum deflection angle θmax, the periodic structure pitch gradually decreases such that the light is largely diffracted in the liquid crystal diffraction element 121.

As a result, the angle range of emitted light of the liquid crystal optical phase modulation element is ±θmax, whereas the emission angle of light emitted from the liquid crystal diffraction element 121 is extended to ±θmaxout.

Here, in a case where an incidence angle of light before being incident into the liquid crystal diffraction element 121 is represented by θ1, a refractive index of a medium on the incidence side is represented by n1, an emission angle of light emitted from the liquid crystal diffraction element 121 is represented by θ2, a refractive index of a medium on the emission side is represented by n2, a wavelength of light is represented by λ, the periodic structure pitch of the liquid crystal diffraction element is represented by p, and a diffraction order is represented by m, these values are associated with each other by the following Expression (101).

$$n1 \cdot \sin \theta 1 - n2 \cdot \sin \theta 2 = m \cdot \lambda / p \qquad (101)$$

As described below, by changing the periodic structure pitch p (rotation period p) of the liquid crystal diffraction element 121, the angle of emitted light from the liquid crystal diffraction element 121 can be changed.

In consideration of Snell's law, the absolute value of the final angle of emission from air can be extended to about 80°. Therefore, the angle θ can be extended up to a significantly large angle. In addition, by continuously changing the periodic structure pitch of the liquid crystal diffraction element 121, that is, the rotation period p of the optically-anisotropic layer 14 in a plane, light can be continuously emitted in any direction.

(Collecting Lens)

As described above, the light deflection device 100 includes the collecting lens 131 as the light collecting element according to the embodiment of the present invention, the liquid crystal optical phase modulation element 101, the λ/4 plate 111, and the liquid crystal diffraction element 121 in order from the upstream side in the light traveling direction.

The collecting lens 131 is a well-known collecting lens and slightly collects light incident into the liquid crystal optical phase modulation element 101.

In the light deflection device 100 according to the embodiment of the present invention, the collecting lens 131 is provided as a preferable aspect. The light deflection device 100 according to the embodiment of the present invention includes the collecting lens 131 such that light (light beam) emitted from the light deflection device 100 (liquid crystal diffraction element 121) can be converted into appropriate parallel light to improve straightness. The action of the collecting lens 131 will be described below in detail.

In the present invention, the light collecting element is not limited to the collecting lens 131, and all the well-known optical elements that can collect light (light beam) can be used.

(Light Deflection Element)

[Liquid Crystal Optical Phase Modulation Element]

The structure of the liquid crystal optical phase modulation element 101 will be described.

Figure 4:
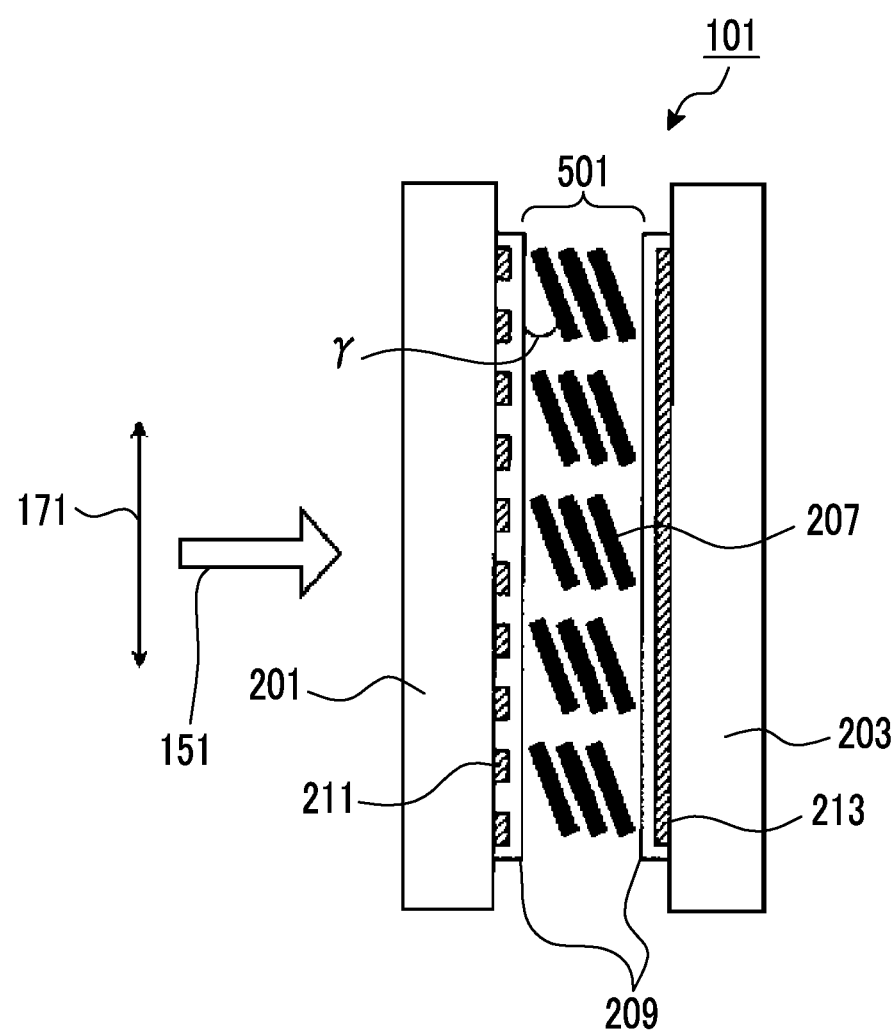
FIG. 4 is a conceptual diagram showing a liquid crystal optical phase modulation element.

FIG. 4 is a cross-sectional view showing an example of the structure of the liquid crystal optical phase modulation element according to the embodiment of the present invention. Here, as the liquid crystal optical phase modulation element described herein as an example, a liquid crystal optical phase modulation element according to Example 1 described in JP2003-295153A is adopted. In the present invention, the liquid crystal optical phase modulation element is not limited to the example shown in the drawing, and all the liquid crystal optical phase modulation elements used as a light deflection element can be used.

In FIG. 4, a nematic liquid crystal layer 501 as an example of the liquid crystal layer is homogeneously aligned by an alignment layer 209 that is formed to cover a composite electrode 211 of a first transparent substrate 201 and an alignment layer 209 that is formed to cover a common electrode 213 of a second transparent substrate 203 in the liquid crystal optical phase modulation element 101 such that a tilt angle γ of a director 207 of a p-type (positive) liquid crystal molecule during non-application of an electric field is 5° or less.

In the liquid crystal optical phase modulation element 101 shown in FIG. 4, the incidence light 151 as the linearly polarized light in the direction indicated by the arrow 171 is converted into linearly polarized light parallel to a light deflection direction from the liquid crystal optical phase modulation element 101. The incidence light 151 is P polarized light in case of being seen from the emission surface 161 of the liquid crystal diffraction element 121.

The first transparent substrate 201 and the second transparent substrate 203 are fixed through a spacer (not shown) such that the nematic liquid crystal layer 501 has a predetermined thickness of several micrometers to several tens of micrometers.

In addition, although not shown in FIG. 4, in order to prevent short-circuit between the composite electrode 211 and the common electrode 213, a transparent insulating film formed of tantalum pentoxide, silicon dioxide, or the like may be formed on at least one of the composite electrode 211 or the common electrode 213. In addition, it is desirable that a multi-layer film consisting of a high refractive index film and a low refractive index film is used as the transparent insulating film to improve transmittance.

The common electrode 213 formed on the second transparent substrate 203 may be a full-surface electrode formed of a transparent conductive film.

With the above-described structure, different voltages can be applied to the transparent electrodes. Therefore, by applying an electric field such that an in-plane distribution of the directors 207 of the liquid crystal molecules is controlled to a predetermined refractive index distribution, incidence light can be deflected by a predetermined angle θ to be emitted due to the lens effect.

This principle is known as a liquid crystal lens, and the same effects can be obtained even with various structures other than the present aspect.

The light deflection device 100 shown in FIG. 1 includes the single liquid crystal optical phase modulation element 101, but the present invention is not limited thereto. The light deflection device 100 may include a plurality of liquid crystal optical phase modulation elements 101.

In addition, in the liquid crystal optical phase modulation element 101, an alignment direction of a liquid crystal cell (liquid crystal compound) may be parallel or vertical. In a case where the alignment direction of the liquid crystal cell is parallel, this configuration contributes to an increase in maximum deflection angle θmax and also contributes to an extension in deflection angle from the liquid crystal optical phase modulation element 101, that is, in deflection angle from the light deflection device 100.

(Drive Unit)

The drive unit 141 is connected to the liquid crystal optical phase modulation element 101.

The drive unit 141 is a well-known drive unit that drives the liquid crystal optical phase modulation element 101 according to the configuration of the liquid crystal optical phase modulation element 101.

[λ/4 Plate]

The λ/4 plate 111 is a well-known λ/4 plate (¼ phase difference plate) that converts linearly polarized light deflected from the liquid crystal optical phase modulation element 101 into circularly polarized light.

As the λ/4 plate 111, a well-known λ/4 plate can be used without any particular limitation. Accordingly, the λ/4 plate 111 may be derived from a polymer or may be derived from liquid crystal.

(Diffraction Element)

[Liquid Crystal Diffraction Element]

Figure 5:
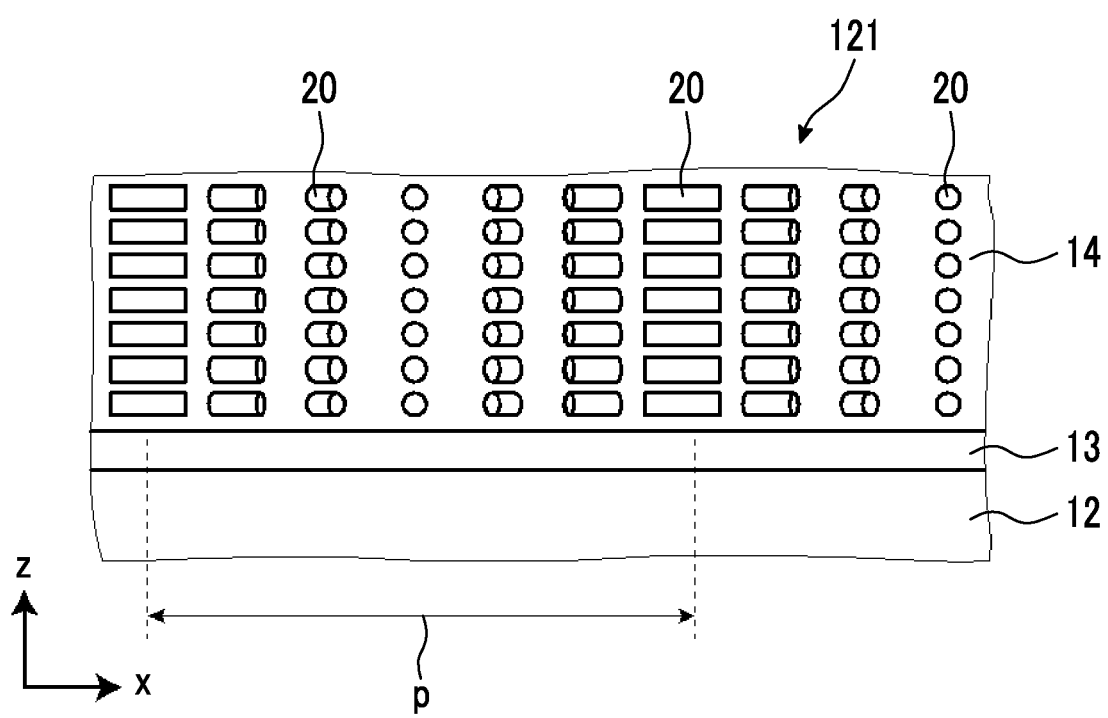
FIG. 5 is a conceptual diagram showing a liquid crystal diffraction element.

FIG. 5 conceptually shows the liquid crystal diffraction element 121. FIG. 5 is a diagram showing the liquid crystal diffraction element 121 in case of being in the same direction as that of FIGS. 1 to 3, and is a side view showing the liquid crystal diffraction element 121.

The liquid crystal diffraction element 121 has a sheet shape and includes a support 12, an alignment film 13, and an optically-anisotropic layer 14.

As described above, the liquid crystal diffraction element 121 diffracts light deflected from the liquid crystal optical phase modulation element 101 in a deflection direction from the liquid crystal optical phase modulation element such that the light deflected from the liquid crystal optical phase modulation element 101 is further deflected. In the light deflection device 100, by using the liquid crystal optical phase modulation element 101 in combination with the liquid crystal diffraction element 121, light can be deflected at a deflection angle of the maximum emission angle θmaxout that is significantly more than the maximum deflection angle θmax of the liquid crystal optical phase modulation element 101.

In the example shown in the drawing, a sheet surface direction of the liquid crystal diffraction element 121 is defined as "x-y direction", and a thickness direction is defined as "z direction". In FIG. 5, a horizontal direction is a direction (axis A direction described below) in which an optical axis derived from a liquid crystal compound rotates in one direction, and this direction is a x direction. Accordingly a y direction is a direction perpendicular to the paper plane of FIG. 5.

In addition, in FIGS. 1 to 3, the up-down direction corresponds to the x direction, a direction perpendicular to the paper plane corresponds to the y direction, and the horizontal direction corresponds to the z direction. The x direction matches the deflection direction from the liquid crystal optical phase modulation element 101. Regarding this point, the same can also be applied to FIG. 13 described below.

In FIGS. 1 to 3, the liquid crystal diffraction element 121 is planar. However, the liquid crystal diffraction element 121 may be curved without being limited to being planar.

<Support>

As the support 12, various sheet-shaped materials (films or plate-shaped materials) can be used as long as they can support the alignment film and the optically-anisotropic layer.

As the support 12, a transparent support is preferable, and examples thereof include a polyacrylic resin film such as polymethyl methacrylate, a cellulose resin film such as cellulose triacetate, and a cycloolefin polymer film. Examples of the cycloolefin polymer film include trade name "ARTON", manufactured by JSR Corporation and trade name "ZEONOR", manufactured by Zeon Corporation).

The support 12 may be a flexible film or may be a non-flexible substrate such as a glass substrate.

<Alignment Film>

In the liquid crystal diffraction element 121, the alignment film 13 is formed on a surface of the support 12.

The alignment film 13 is an alignment film for aligning a liquid crystal compound 20 to a predetermined liquid crystal alignment pattern during the formation of the optically-anisotropic layer 14.

Although described below, in the liquid crystal diffraction element 121, the optically-anisotropic layer 14 has a liquid crystal alignment pattern in which a direction of an optical axis 22 derived from the liquid crystal compound 20 changes while continuously rotating in one in-plane direction. Accordingly, the alignment film 13 of the liquid crystal diffraction element 121 is formed such that the optically-anisotropic layer 14 can form the liquid crystal alignment pattern.

In the optically-anisotropic layer 14 of the liquid crystal diffraction element 121, in the liquid crystal alignment pattern, a length over which the direction of the optical axis 22 rotates by 180° in the in-plane direction (the direction along the axis A described below) in which the direction of the optical axis 22 changes while continuously rotating is set as a single period A (the rotation period p of the optical axis 22). In the optically-anisotropic layer 14 of the light deflection device 100 according to the embodiment of the present invention, the single period gradually decreases from the center of deflection (deflection orientation (deflection direction)) from the liquid crystal optical phase modulation element 101 toward the outside. In addition, the rotation direction of the optical axis of the liquid crystal compound 20 is reversed in the direction along the axis A (arrow X direction) at the center of deflection from the liquid crystal optical phase modulation element 101. Accordingly, the alignment film 13 of the liquid crystal diffraction element 121 is formed such that the optically-anisotropic layer 14 can form the liquid crystal alignment pattern.

As the alignment film 13, various well-known films can be used.

Examples of the alignment film 13 of the optically-anisotropic layer 14 include a rubbed film formed of an organic compound such as a polymer, an obliquely deposited film formed of an inorganic compound, a film having a microgroove, and a film formed by lamination of Langmuir-Blodgett (LB) films formed with the Langmuir-Blodgett technique using an organic compound such as w-tricosanoic acid, dioctadecylmethylammonium chloride, or methyl stearate.

Examples of the alignment film 13 include a film obtained by rubbing a surface of a polymer layer. The rubbing treatment is performed by rubbing a surface of a polymer layer with paper or fabric in a given direction multiple times. As the kind of the polymer used for the alignment film, for example, polyimide, polyvinyl alcohol, a polymer having a polymerizable group described in JP1997-152509A (JP-H9-152509A), or a vertical alignment film such as JP2005-097377A, JP2005-099228A, and JP2005-128503A can be preferably used.

The vertical alignment film described in the present invention refers to an alignment film in which a major axis of a molecule of the polymerizable rod-shaped liquid crystal compound according to the present invention is aligned to be substantially perpendicular to a rubbing direction of the vertical alignment film. The thickness of the alignment film is not necessarily large as long as it can provide the alignment function, and is preferably 0.01 to 5 μm and more preferably 0.05 to 2 μm.

As the alignment film 13, a so-called photo-alignment film obtained by irradiating a photo-alignable material with polarized light or non-polarized light can be used. That is, the photo-alignment film may be prepared by applying the photo-alignable material to the support 12.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslking polyimide, polyamide, or ester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A. Among these, an azo compound, a photocrosslinking polyimide, polyamide, ester, a cinnamate compound, or a chalcone compound is more preferable.

In the present invention, the photo-alignment film is preferably used.

Figure 11:
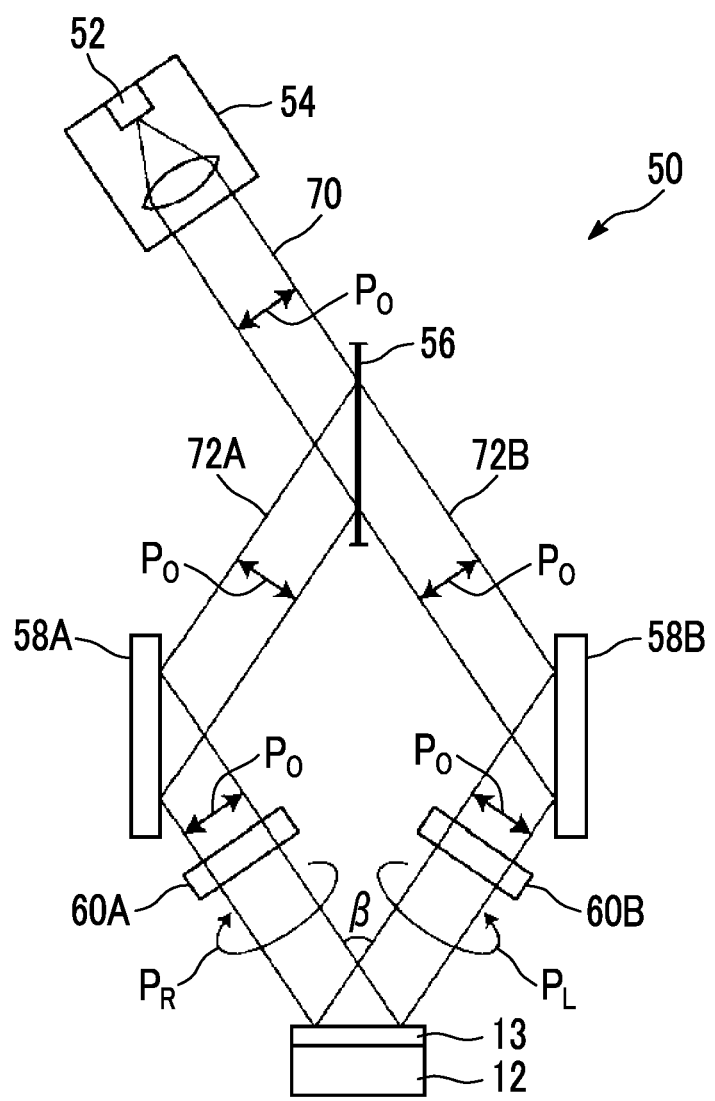
FIG. 11 is a conceptual diagram showing an exposure device that exposes an alignment film.

FIG. 11 is a schematic diagram showing an exposure device for an alignment film, in which the photo-alignable material is applied to the support 12 and dried to form an alignment film and the alignment film is exposed to form an alignment pattern.

An exposure device 50 includes: a light source 54 including a laser 52; a beam splitter 56 that splits laser light 70 emitted from the laser 52 into two beams 72A and 72B; mirrors 58A and 58B that are disposed on optical paths of the splitted two beams 72A and 72B; and λ/4 plates 60A and 60B.

Although not shown in the drawing, for example, the light source 64 includes a polarizing plate and emits linearly polarized light $P_0$. The λ/4 plates 60A and 60B have optic axes perpendicular to each other, the λ/4 plate 60A converts the linearly polarized light $P_0$ into right circularly polarized light $P_R$, and the λ/4 plate 60B converts the linearly polarized light $P_0$ into left circularly polarized light $P_L$.

The support 12 including the alignment film 13 on which the alignment pattern is not yet formed is disposed at an exposed portion, the two beams 72A and 72B intersect and interfere each other on the alignment film 13, and the alignment film 13 is irradiated with and exposed to the interference light.

Due to the interference at this time, the polarization state of light with which the alignment film 13 is irradiated periodically changes according to interference fringes. As a result, an alignment pattern in which the alignment state periodically changes can be obtained.

In the exposure device 50, by changing an intersection angle β between the two beams 72A and 72B, the period of the alignment pattern can be changed. That is, by adjusting the intersection angle β in the exposure device 50, in the alignment pattern in which the optical axis 22 derived from the liquid crystal compound 20 continuously rotates in the in-plane direction, the length of the single period (rotation period p) over which the optical axis 22 rotates by 180° in the in-plane direction in which the optical axis 22 rotates can be adjusted.

By forming the optically-anisotropic layer 14 described below on the alignment film 13 having the pattern in which the alignment state periodically changes, the optically-anisotropic layer 14 having the liquid crystal alignment pattern corresponding to the period can be formed.

In addition, by rotating the optical axes of the λ/4 plates 60A and 60B by 90°, respectively, the rotation direction of the optical axis 22 can be reversed. Accordingly, by masking half of a surface of the alignment film 13, performing exposure, masking the exposed region, rotating the optical axes of the λ/4 plate 60A and the λ/4 plate 60B by 90°, respectively, and performing exposure, the rotation direction of the optical axis 22 can be reversed at the center in the in-plane direction in which the optical axis 22 of the liquid crystal compound 20 rotates.

Further, by repeating the operations of adjusting the intersection angle β of the beams 72A and 72B, masking an unnecessary region, and performing exposure, the length of the single period (rotation period p) over which the optical axis 22 rotates by 180° can gradually decrease toward the outside from the center in the in-plane direction in which the optical axis 22 rotates.

Figure 10:
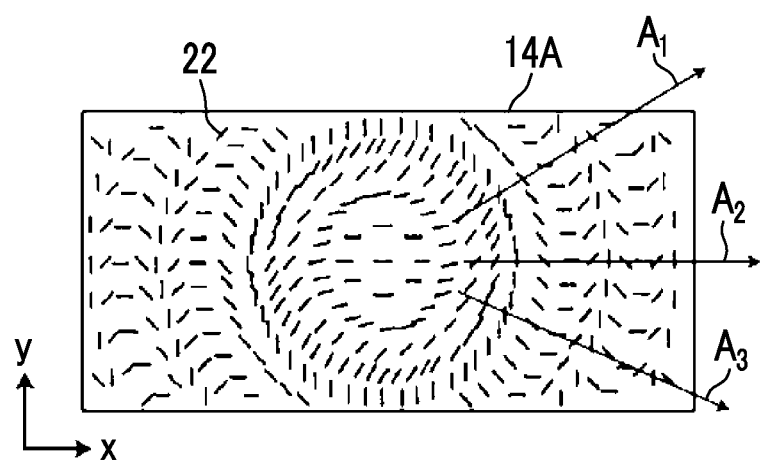
FIG. 10 is a schematic plan view showing another example of the optically-anisotropic layer.
Figure 12:
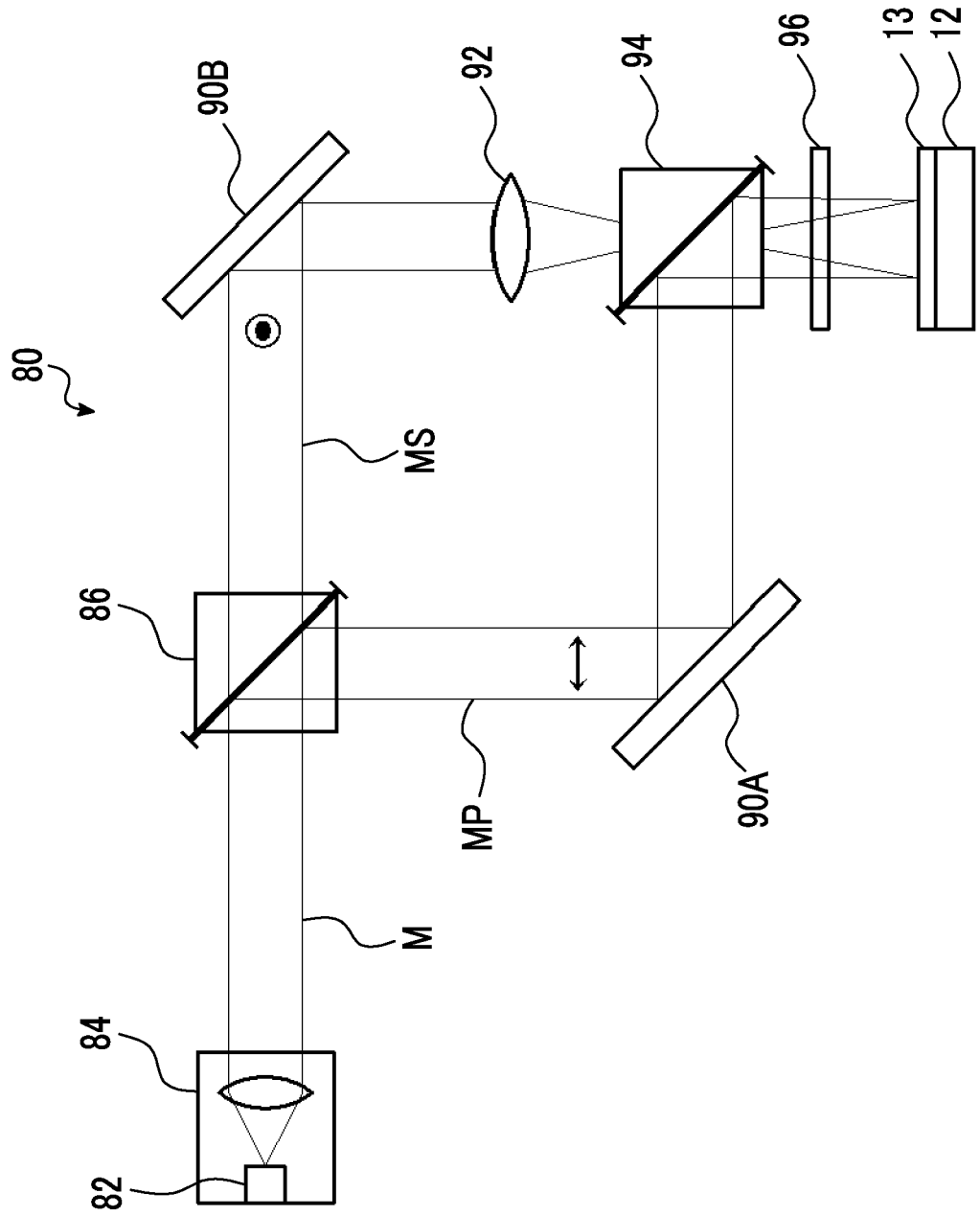
FIG. 12 is a conceptual diagram showing another example of the exposure device that exposes an alignment film.

In addition, in order to expose the alignment film 13, an exposure device 80 conceptually shown in FIG. 12 is suitably used. The exposure device 80 shown in FIG. 12 is used to form a liquid crystal alignment pattern having a concentric circular shape as shown in FIG. 10.

An exposure device 80 includes: a light source 84 that includes a laser 82; a polarization beam splitter 86 that divides the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 (convex lens) that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 13 on the support 12.

Due to interference between the right circularly polarized light and the left circularly polarized light, the polarization state of light with which the alignment film 13 is irradiated periodically changes according to interference fringes. The intersection angle between the right circularly polarized light and the left circularly polarized light changes from the inside to the outside of the concentric circle. Therefore, an exposure pattern in which the pitch changes from the inside to the outside can be obtained. As a result, in the alignment film 13, a concentric circular alignment pattern in which the alignment state periodically changes can be obtained.

In the exposure device 80, the length of the single period (rotation period p) over which the optical axis 22 of the liquid crystal compound 20 continuously rotates by 180° in the in-plane direction can be controlled by changing the refractive power of the lens 92 (the F number of the lens 92), the focal length of the lens 92, the distance between the lens 92 and the alignment film 13, and the like.

In addition, by adjusting the refractive power of the lens 92 (the F number of the lens 92), the length of the single period over which the optical axis 22 rotates by 180° in the in-plane direction in which the optical axis 22 continuously rotates can be changed. Specifically, the length of the single period over which the optical axis 22 rotates by 180° can be changed depending on the degree to which light transmitted through the lens 92 is collected for interference with parallel light. More specifically, in a case where the refractive power of the lens 92 is weak, light is approximated to parallel light. Therefore, the length of the single period over which the optical axis 22 rotates by 180° gradually decreases from the inside toward the outside, and the F number increases. Conversely, in a case where the refractive power of the lens 92 becomes stronger, the length of the single period over which the optical axis 22 rotates by 180° rapidly decreases from the inside toward the outside, and the F number decreases.

This way, the configuration of changing the length of the single period (rotation period p) over which the optical axis 22 rotates by 180° in the in-plane direction in which the optical axis 22 continuously rotates can also be used in the configuration shown in FIGS. 1 to 10 in which the optical axis 22 of the liquid crystal compound 20 continuously rotates only in the in-plane direction as the arrow X direction.

For example, by gradually decreasing the single period over which the optical axis 22 rotates by 180° in the arrow X direction, an optical element that allows transmission of light to be collected can be obtained. In addition, by reversing the direction in which the optical axis 22 in the liquid crystal alignment pattern rotates by 180°, an optical element that allows transmission of light to be diffused only in the arrow X direction can be obtained. By reversing the turning direction of incident circularly polarized light, an optical element that allows transmission of light to be diffused only in the arrow X direction can be obtained.

Further, depending on the uses of the optical element such as a case where it is desired to provide a light amount distribution in transmitted light, a configuration in which regions having partially different single periods over which the optical axis 22 rotates by 180° in the arrow X direction are provided can also be used instead of the configuration in which the length of the single period over which the optical axis 22 rotates by 180° gradually changes in the arrow X direction. For example, as a method of partially changing the single period over which the optical axis 22 rotates by 180°, for example, a method of scanning and exposing the photo-alignment film to be patterned while freely changing a polarization direction of laser light to be gathered can be used.

In the liquid crystal diffraction element 121, the alignment film 13 is provided as a preferable aspect and is not an essential component.

For example, the following configuration can also be adopted, in which, by forming the alignment pattern on the support 12 using a method of rubbing the support 12, a method of processing the support 12 with laser light or the like, or the like, the optically-anisotropic layer 14 has the liquid crystal alignment pattern in which the direction of the optical axis 22 derived from the liquid crystal compound 20 changes while continuously rotating in at least one in-plane direction.

<Optically-Anisotropic Layer>

In the liquid crystal diffraction element 121, the optically-anisotropic layer 14 that is a cured layer of the liquid crystal composition including the liquid crystal compound 20 is provided on a surface of the alignment film 13.

The optically-anisotropic layer 14 has a liquid crystal alignment pattern in which the optical axis (slow axis) of the liquid crystal compound is arranged in at least one in-plane direction of the optically-anisotropic layer and in which the direction of the optical axis 22 of the liquid crystal compound 20 changes while rotating in the in-plane direction.

In the liquid crystal diffraction element 121 according to the embodiment, a retardation R ($=\Delta n$ d1) of the optically-anisotropic layer 14 in the thickness direction (in the drawing, the z direction) with respect to light having the wavelength $\lambda$ is $0.36\lambda$ to $0.64\lambda$. The retardation R is preferably $0.4\lambda$ to $0.6\lambda$, more preferably $0.45\lambda$ to $0.55\lambda$, and still more preferably $0.5\lambda$. An represents a birefringence of the optically-anisotropic layer 14, and d1 represents a thickness. For example, in a case where light having a wavelength of 940 nm is assumed as incidence light, the retardation R with respect to the light having a wavelength of 940 nm may be in a range of 338 to 602 nm and is preferably 470 nm.

By having the retardation R, the optically-anisotropic layer 14 exhibits a function as a $\lambda/2$ plate, that is, a function of imparting a phase difference of 180° ($=\pi=\lambda/2$) between linearly polarized light components of incidence light perpendicular to each other.

The liquid crystal diffraction element 121 functions as a transmission diffraction grating. The principle in which the liquid crystal diffraction element 121 functions as a diffraction grating will be described with reference to FIGS. 5 and 6.

Figure 6:
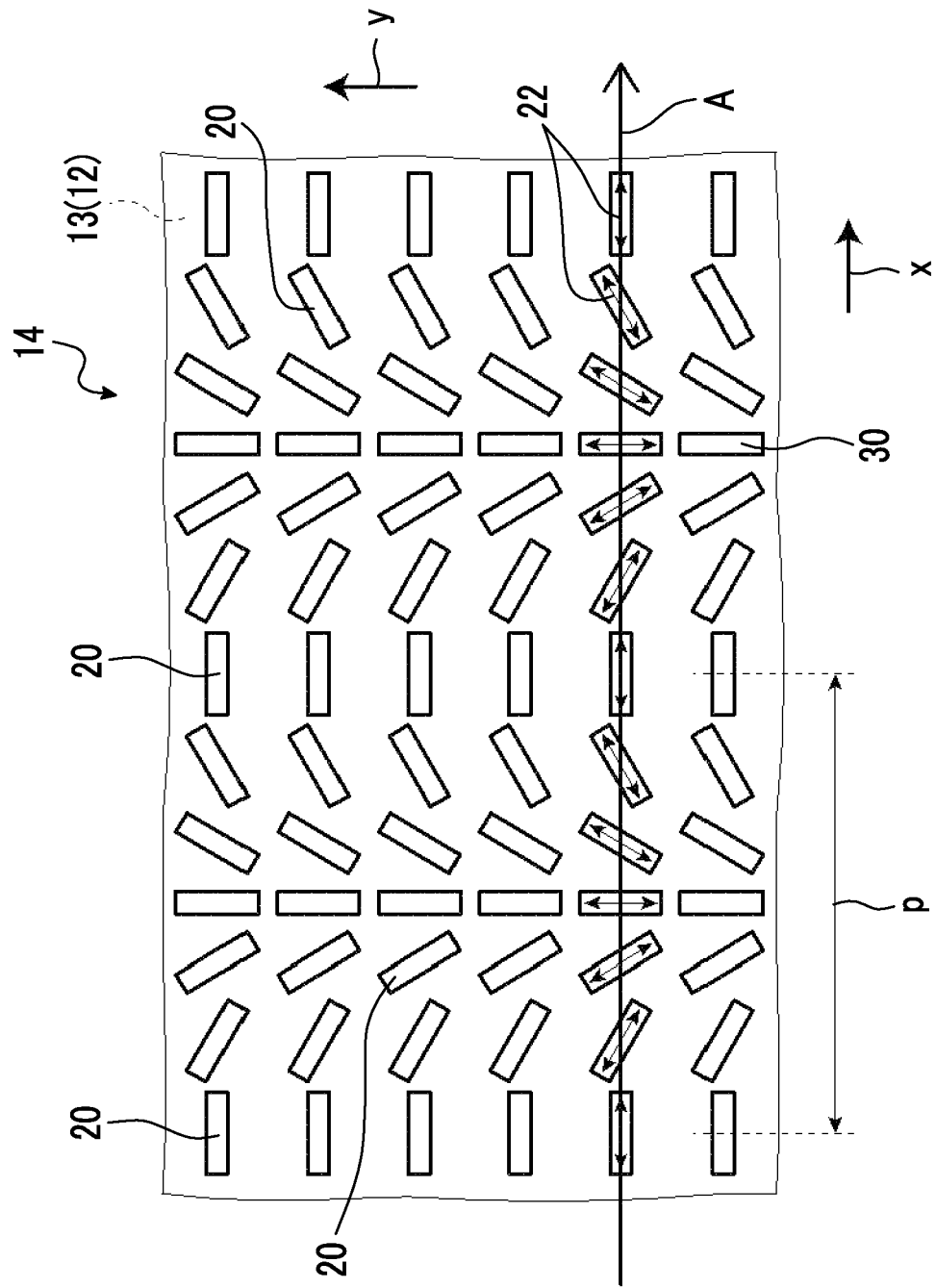
FIG. 6 is a schematic plan view showing an optically-anisotropic layer.

FIG. 6 is a schematic plan view showing the optically-anisotropic layer 14, that is, a diagram showing FIG. 5 in case of being seen from the top.

As shown in FIGS. 5 and 6, in the optically-anisotropic layer 14, the liquid crystal compound 20 is immobilized in the liquid crystal alignment pattern in which the optical axis 22 changes while continuously changing in the in-plane direction. In the example shown in the drawing, the optical axis 22 changes while continuously rotating in the direction along the axis A in FIG. 6 that matches the arrow X direction. That is, the liquid crystal compound 20 is aligned such that an angle between an in-plane component of the major axis (the axis of extraordinary light: director) of the liquid crystal compound 20 defined as the optical axis 22 and the axis A changes while rotating.

As shown in FIG. 6, in the optically-anisotropic layer 14, the direction of the optical axis 22 of the liquid crystal compound 20 is the same in the liquid crystal compound 20 in which that is arranged in a direction perpendicular to the axis A, that is, in an arrow y direction. The optically-anisotropic layer 14 exhibits the above-described general function as a $\lambda/2$ plate in regions having the same direction of the optical axis 22 of the liquid crystal compound 20 in the y direction.

The liquid crystal alignment pattern in which the direction of the optical axis 22 changes while rotating is a pattern in which the liquid crystal compound 20 is aligned and immobilized such that an angle between the optical axis 22 of the liquid crystal compound 20 arranged along the axis A and the axis A varies depending on positions in the axis A direction and gradually changes from $\phi$ to $\phi+180°$ or $\phi-180°$.

In the following description, as shown in FIG. 6, the liquid crystal alignment pattern in which the optical axis 22 of the liquid crystal compound 20 is parallel to a surface of the optically-anisotropic layer 14, local regions (unit regions) where the direction of the optical axis 22 is constant, that is, regions where the liquid crystal compound 20 is arranged in the arrow Y direction are arranged in the x direction perpendicular to the arrow y direction, and the direction of the optical axis 22 change while continuously rotating in the in-plane direction (the direction along the axis A) in the plurality of local regions arranged in the arrow X direction will be referred to as "horizontal rotation alignment".

"Changing while continuously rotating" may represent that regions the same angle such as 30° rotate to be adjacent to each other in a range of 0° to 180° (=0°) as shown in FIGS. 5 and 6. In addition, a change in the angle of the optical axis 22 in the axis A direction may be rotation at different angle intervals instead of a uniform angle interval. In the present invention, in a case where the average value of the directions of the optical axes 22 in the unit region changes linearly at a constant ratio, it can be said that the direction of the optical axis gradually changes. However, a change in the slope of the optical axis between unit regions adjacent to each other in the axis A direction and having different slopes of the optical axes 22 is preferably 45° or less. It is preferable that a change in slope between unit regions adjacent to each other is as small as possible.

In the optically-anisotropic layer 14, the distance over which the angle between the optical axis 22 and the axis A in the axis A direction changes from $\phi$ to $\phi+180°$ (returning to the original position), that is, the period over which the optical axis 22 rotates by 180° will be referred to as "rotation period p". The rotation period p is preferably 0.5 to 5 µm. As the rotation period p decreases, the diffraction angle from the optically-anisotropic layer 14, that is, the liquid crystal diffraction element 121 increases. Accordingly, the rotation period p may be determined depending on a wavelength of incidence light into the liquid crystal diffraction element 121 and a desired emission angle.

With the above-described configuration of the optically-anisotropic layer 14, the liquid crystal diffraction element 121 imparts a phase difference of λ/2 and emits incidence light incident at an incidence angle of 0°, that is, vertically incident light at an emission angle θ2.

Figure 7:
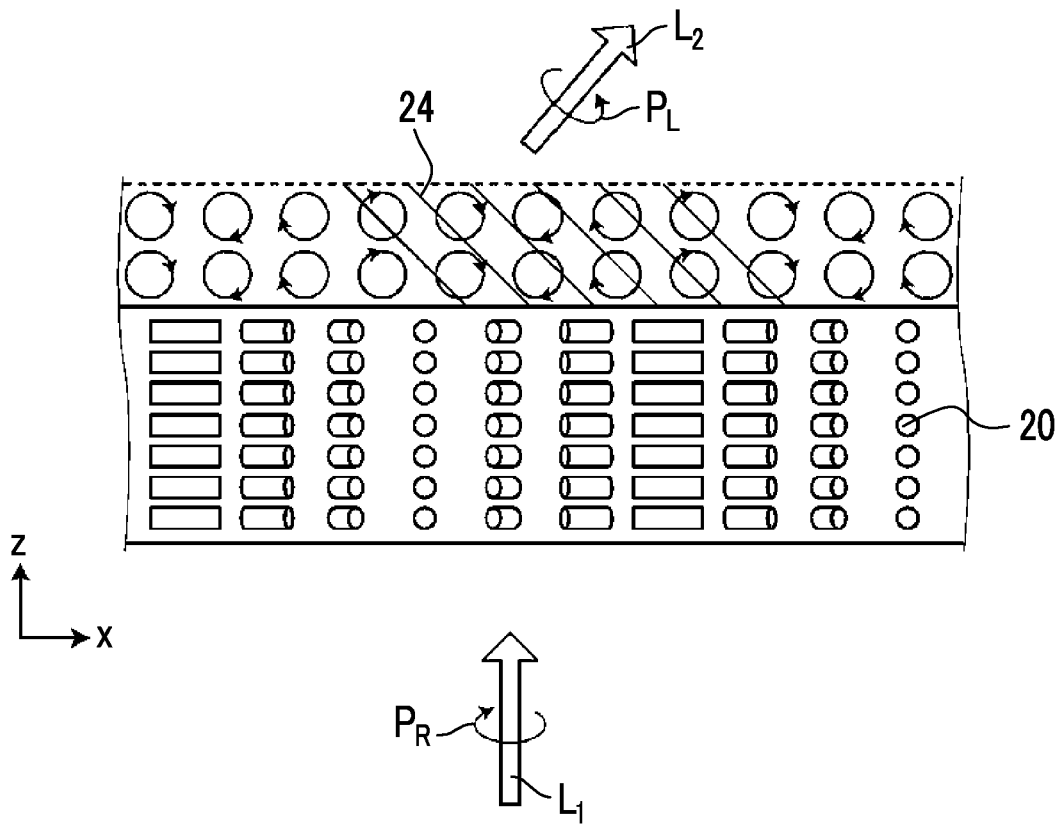
FIG. 7 is a conceptual diagram showing an action of the optically-anisotropic layer.

That is, as shown in FIG. 7 described below, in a case where light $L_1$ of right circularly polarized light $P_R$ is vertically incident into a surface of the optically-anisotropic layer 14, light $L_2$ of left circularly polarized light $P_L$ is emitted in a direction having an angle θ2 with respect to the normal direction. In other words, Light being vertically incident into the surface of the optically-anisotropic layer 14 is light being incident along the normal line of the surface. In addition, the light $L_1$ of right circularly polarized light $P_R$ incident into the optically-anisotropic layer 14 will also be referred to "incidence light $L_1$". Further, in the following description, the light $L_1$ of left circularly polarized light $P_L$ emitted the optically-anisotropic layer will also be referred to "emitted light $L_2$".

In the liquid crystal diffraction element 121, in a case where light having a predetermined wavelength is incident, as the rotation period p of the optically-anisotropic layer 14 decreases, the diffraction angle, that is, the emission angle of the emitted light $L_2$ increases. The emission angle of the emitted light $L_2$ is an angle between the normal direction of the optically-anisotropic layer 14 and the emitted light $L_2$.

The liquid crystal diffraction element 121 has different diffraction orientations for right circularly polarized light and left circularly polarized light. Therefore, regarding the diffraction direction of the emitted light $L_2$ from the liquid crystal diffraction element 121, the state of circularly polarized light to be incident into the liquid crystal diffraction element 121 is controlled to be incident. That is, as in the example shown in the drawing, in a case where incidence light is linearly polarized light, by inserting the λ/4 plate 111 to convert the linearly polarized light into left circularly polarized light or right circularly polarized light, the orientation of diffraction of light can be controlled to only one of the right or left side.

FIG. 7 is a diagram schematically showing the principle in which the incidence light $L_1$ vertically incident into the optically-anisotropic layer 14 is emitted at the predetermined emission angle θ2. Hereinafter, the action of the optically-anisotropic layer 14 will be described with reference to FIG. 7.

First, a case where right circularly polarized light $P_R$ having the wavelength λ is used as the incidence light $L_1$ will be described.

The incidence light $L_1$ as the right circularly polarized light $P_R$ transmits through the optically-anisotropic layer 14 to be imparted with a phase difference of λ/2 and is converted into left circularly polarized light $P_L$.

In addition, in the optically-anisotropic layer 14, the absolute phase of the incidence light $L_1$ changes due to the optical axis 22 of the liquid crystal compound 20 in each of the unit regions (local regions). Here, in the optically-anisotropic layer 14, the direction of the optical axis 22 of the liquid crystal compound 20 changes while rotating in the axis A direction (in this example, that matches the arrow X direction). Therefore, the amount of change in absolute phase varies depending on the direction of the optical axis 22 of the liquid crystal compound 20 at x coordinates (the position in the x direction) of a plane (x-y plane) of the optically-anisotropic layer 14 into which incidence light is incident. In a region indicated by a broken line in FIG. 7, the state where the amount of change in absolute phase varies depending on x coordinates is schematically shown.

As shown in FIG. 7, due to a shift of the absolute phase in a case where light passes through the optically-anisotropic layer 14, an equiphase surface 24 having an absolute phase with an angle with respect to the plane of the optically-anisotropic layer is formed. As a result, a bending force in a direction perpendicular to the equiphase surface 24 is applied to the incidence light $L_1$ incident from the normal direction such that the traveling direction of the incidence light $L_1$ changes. That is, the incidence light $L_1$ as the right circularly polarized light $P_R$ is converted into left circularly polarized light $P_L$ after passing through the optically-anisotropic layer 14, and is emitted from the optically-anisotropic layer 14 as the emitted light $L_2$ that travels in a direction having the angle θ2 with respect to the normal direction.

As described above, in the liquid crystal diffraction element 121, the incidence light $L_1$ incident in the normal direction perpendicular to the plane of the liquid crystal diffraction element 121 is emitted as the emitted light $L_2$ in a direction different from the normal direction.

By changing the rotation period p of the direction of the optical axis in the liquid crystal alignment pattern of the optically-anisotropic layer 14, the slope of the emission angle can be changed. As the rotation period p decreases, a high bending force can be applied to the incidence light, and thus the slope can be increased.

This way, due to the liquid crystal alignment pattern in the optically-anisotropic layer 14, the amount of change in absolute phase can be changed to change a wave surface of the incidence light.

In a case where the liquid crystal diffraction element 121 has the liquid crystal alignment pattern of the rotation period p that is uniform only in one direction, the conversion of the incidence light $L_1$ into the emitted light $L_2$ based on the above-described principle can be described as transmission diffraction.

The optically-anisotropic layer 14 functions as a transmission diffraction grating with respect to the incidence light $L_1$, and the incidence light $L_1$ vertically incident into the optically-anisotropic layer 14 is transmitted and diffracted as the emitted light (transmitted and diffracted light) $L_2$ having a predetermined diffraction angle θ2. In this case the following Expression (1) that is an general expression for light diffraction is satisfied.

$$n2 \sin θ2 - n1 \sin θ1 = mλ/p \qquad \text{Expression (1)}$$

Here, n1 represents a refractive index of a medium 1 on the incidence surface side of a diffraction grating (here, the optically-anisotropic layer 14), θ1 represents an incidence angle, n2 represents a refractive index of a medium 2 on the emission surface side of a diffraction grating (here, the optically-anisotropic layer), θ1 represents a diffraction angle (emission angle), λ represents a wavelength, p represents a rotation period, and m represents a diffraction order. Here, conditions are set such that the maximum diffraction efficiency is obtained at m=1. In addition, here, since incidence angle θ1=0°, Expression (1) is as follows.

$$n2 \sin θ2 = λ/p \qquad \text{Expression (2)}$$

Figure 8:
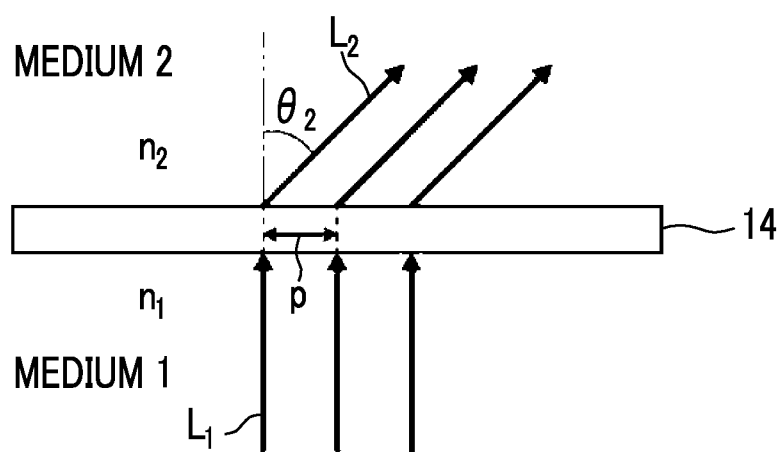
FIG. 8 is a conceptual diagram showing an action of the optically-anisotropic layer.

FIG. 8 is a diagram schematically showing the diffraction phenomenon represented by Expression (2).

The optically-anisotropic layer 14 as a diffraction grating is disposed between the medium n1 and the medium n2.

The light $L_1$ incident from the medium 1 side having a refractive index n1 into the optically-anisotropic layer 14 in the normal direction is diffracted due to the diffraction action from the optically-anisotropic layer 14 and is emitted to the medium 2 side having a refractive index n2. At this time, the emitted light $L_2$ emitted at the emission angle θ2 can be rephrased with the transmitted and diffracted light $L_2$ having the diffraction angle θ2.

This way, the optically-anisotropic layer 14 obtained by performing the horizontal rotation alignment on the liquid crystal compound 20 to be immobilized functions as diffraction grating.

The wavelength λ of light that causes the diffraction effect to occur due to the liquid crystal diffraction element 121 (optically-anisotropic layer 14) may be in a ultraviolet range, a visible range, or an infrared range or may be on an electromagnetic wave level.

At the same rotation period p, as the wavelength of the incidence light increases, the diffraction angle increases, and as the wavelength of the incidence light decreases, the diffraction angle decreases.

Although described below, as the liquid crystal compound 20, a rod-shaped liquid crystal compound or a disk-shaped liquid crystal compound can be used. In a case where the wavelength λ is 380 nm and the rotation period p (μm) is in a range of 0.5<p<1, the disk-shaped liquid crystal compound can obtain a higher diffraction efficiency than the rod-shaped liquid crystal compound. In addition, in a case where the wavelength λ is 1100 nm and the rotation period p (μm) is in a range of 2<p<5, the disk-shaped liquid crystal compound can obtain a higher diffraction efficiency than the rod-shaped liquid crystal compound.

As shown in FIG. 7, in a case where incidence light $L_1$ of right circularly polarized light $P_R$ is incident along the normal line of the surface of the liquid crystal diffraction element 121, emitted light $L_2$ of left circularly polarized light $P_L$ is emitted in a direction having the angle θ2 with respect to the normal direction.

On the other hand, in a case where left circularly polarized light is incident into the liquid crystal diffraction element 121 as incidence light, the incidence light is converted into right circularly polarized light in the optically-anisotropic layer 14, and the traveling direction is changed by a bending force in a direction opposite to that of FIG. 7.

Figure 9:
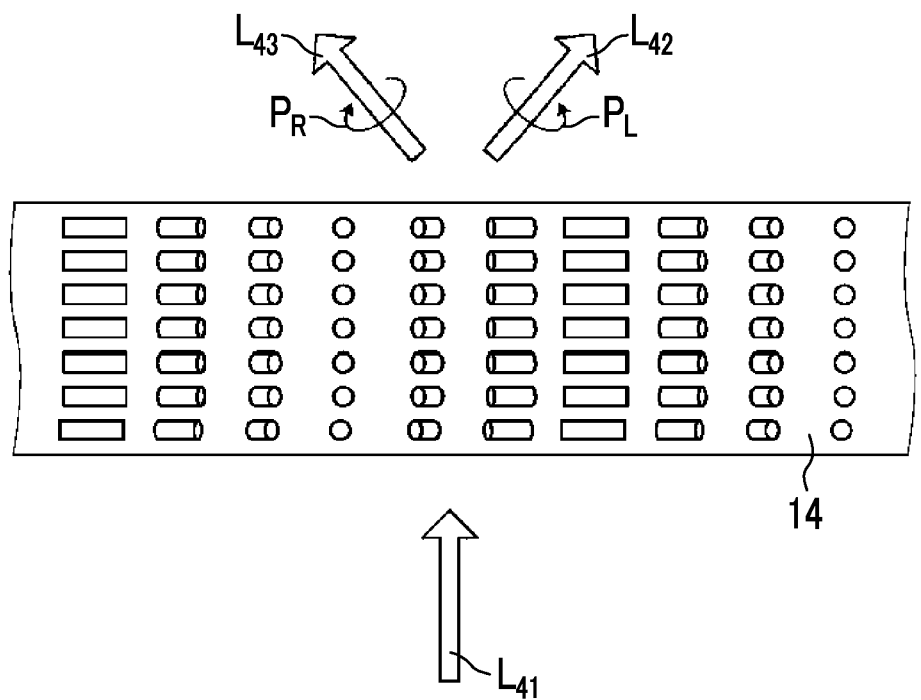
FIG. 9 is a conceptual diagram showing an action of the optically-anisotropic layer.

As shown in FIG. 9, in a case where incidence light $L_{41}$ of randomly polarized light is incident into the liquid crystal diffraction element 121 (optically-anisotropic layer 14), a right circularly polarized light $P_R$ component in the incidence light $L_{41}$ is converted into left circularly polarized light $P_L$ in the optically-anisotropic layer 14 as described above, the traveling direction is changed by a bending force due to the liquid crystal alignment pattern, and the left circularly polarized light $P_L$ transmits through the optically-anisotropic layer to be emitted as first transmitted and diffracted light $L_{42}$.

On the other hand, a left circularly polarized light $P_L$ component in the incidence light $L_{41}$ is converted into right circularly polarized light $P_R$ in the optically-anisotropic layer 14, the traveling direction is changed by a bending force in a direction opposite to that of the left circularly polarized light converted from the right circularly polarized light, and the right circularly polarized light $P_R$ transmits through the optically-anisotropic layer 14 to be emitted as second transmitted and diffracted light $L_{43}$ from a surface opposite to the liquid crystal diffraction element 121. The traveling directions of the first transmitted and diffracted light $L_{42}$ and the second transmitted and diffracted light $L_{43}$ are substantially axisymmetric to each other with respect to the normal line.

In the above description, the example in which incidence light is vertically incident into the optically-anisotropic layer. However, even in a case where incidence light is obliquely incident into the optically-anisotropic layer, the effect of transmission diffraction can also be obtained.

In a case where incidence light is obliquely incident into the optically-anisotropic layer, the rotation period may be designed in consideration of the incidence angle θ1 such that Expression (1) is satisfied and the desired diffraction angle θ2 can be obtained.

As described above, in the light deflection device 100 according to the embodiment of the present invention, light deflected from the liquid crystal optical phase modulation element 101 is refracted (diffracted) by the liquid crystal diffraction element 121 (optically-anisotropic layer 14) such that the light can be deflected at a deflection angle of the maximum emission angle θmaxout that is significantly more than the maximum deflection angle θmax of the liquid crystal optical phase modulation element 101.

The refraction (diffraction angle) of light from the optically-anisotropic layer 14 increases as the single period over which the optical axis 22 of the liquid crystal compound 20 rotates by 180°, that is, the rotation period p decreases.

In addition, in a case where the deflection directions (turning directions) of circularly polarized light to be incident are the same, the refraction direction of light from the optically-anisotropic layer 14 is reversed by the rotation direction of the optical axis 22 of the liquid crystal compound 20.

That is, in a case where the incidence light $L_1$ is right circularly polarized light $P_R$ and the rotation direction of the optical axis 22 is clockwise in the axis A direction (arrow X direction) from the emission surface side as shown in FIGS. 5 to 7, the emitted light $L_2$ is refracted, for example, in the axis A direction.

On the other hand, in a case where the incidence light $L_1$ is right circularly polarized light $P_R$ and the rotation direction of the optical axis 22 is counterclockwise in the axis A direction from the emission surface side, the emitted light $L_2$ is refracted in a direction opposite to the axis A direction (refer to emitted light $L_{43}$ in FIG. 9).

Accordingly, in the optically-anisotropic layer 14 of the light deflection device 100 according to the embodiment of the present invention, the rotation period p of the optical axis 22 of the liquid crystal compound 20 in the axis A direction gradually decreases from the center of deflection (deflection orientation) from the liquid crystal optical phase modulation element 101 toward the outside. That is, the amount of refraction of light from the optically-anisotropic layer 14 increases toward the outside in the deflection direction.

Further, in the optically-anisotropic layer 14 of the light deflection device 100 according to the embodiment of the present invention, the rotation direction of the optical axis 22 of the liquid crystal compound 20 in the axis A direction is reversed at the center of deflection from the liquid crystal optical phase modulation element 101. For example, in the example shown in the drawing, the rotation direction of the optical axis 22 in the axis A direction is set to be counterclockwise from the upstream side in the axis A direction to the center in the deflection direction, the rotation direction of the optical axis 22 is reversed at the center of deflection, and the rotation direction of the optical axis 22 is set to be clockwise from the center of deflection to the downstream side in the axis A direction.

In a case where the light deflection device 100 according to the embodiment of the present invention has the above-described configuration, light can be deflected at a deflection angle of the maximum emission angle θmaxout that is significantly more than the maximum deflection angle θmax of the liquid crystal optical phase modulation element 101.

The rotation direction of the optical axis 22 is reversed at the center of the optically-anisotropic layer 14 in the axis A direction (arrow X direction), that is, in the in-plane direction in which the optical axis 22 rotates. That is, in the light deflection device 100, the center of deflection from the liquid crystal optical phase modulation element 101 and the center of optically-anisotropic layer 14 in the axis A direction are matched to each other.

In the present invention, the rotation period p may decrease continuously or stepwise from the center of deflection toward the outside.

<Formation of Optically-Anisotropic Layer>

For example, the optically-anisotropic layer 14 is formed using the liquid crystal composition including the liquid crystal compound.

In order to form the optically-anisotropic layer 14, the liquid crystal composition including the liquid crystal compound may include other components such as a leveling agent, an alignment controller, a polymerization initiator, or an alignment assistant in addition to the liquid crystal compound. By forming an alignment film on the support, applying the liquid crystal composition to the alignment film, and curing the applied liquid crystal composition, the optically-anisotropic layer that is formed of the cured layer of the liquid crystal composition is obtained by immobilizing the predetermined liquid crystal alignment pattern can be obtained.

Next, each of the components of the liquid crystal composition according to the embodiment of the present invention will be described in detail.

The optically-anisotropic layer 14 is formed of a cured layer of a liquid crystal composition including a rod-shaped liquid crystal compound or a disk-shaped liquid crystal compound, and has a liquid crystal alignment pattern in which an optical axis of the rod-shaped liquid crystal compound or an optical axis of the disk-shaped liquid crystal compound is aligned as described above.

By forming an alignment film on the support 12, applying the liquid crystal composition to the alignment film, and curing the applied liquid crystal composition, the optically-anisotropic layer consisting of the cured layer of the liquid crystal composition can be obtained. Although the optically-anisotropic layer functions as a so-called λ/2 plate, the present invention also includes an aspect where a laminate including the support 12 and the alignment film that are integrated functions as a so-called λ/2 plate.

In addition, the liquid crystal composition for forming the optically-anisotropic layer includes a rod-shaped liquid crystal compound or a disk-shaped liquid crystal compound and may further include other components such as a leveling agent, an alignment controller, a polymerization initiator, or an alignment assistant.

In addition, it is preferable that the optically-anisotropic layer has a wide range for the wavelength of incidence light and is formed of a liquid crystal material having a reverse birefringence dispersion.

Further, it is also preferable that the optically-anisotropic layer can be made to have a substantially wide range for the wavelength of incidence light by imparting a torsion component to the liquid crystal composition or by laminating different phase difference layers. For example, in the optically-anisotropic layer, a method of realizing a λ/2 plate having a wide-range pattern by laminating two liquid crystal layers having different twisted directions is disclosed in, for example, JP2014-089476A and can be preferably used in the present invention.

—Rod-Shaped Liquid Crystal Compound—

As the rod-shaped liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-shaped liquid crystal compound, not only the above-described low molecular weight liquid crystal molecules but also high molecular weight liquid crystal molecules can be used.

It is preferable that the alignment of the rod-shaped liquid crystal compound is immobilized by polymerization. Examples of the polymerizable rod-shaped liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-064627A. Further, as the rod-shaped liquid crystal compound, for example, compounds described in JP1999-513019A (JP-H11-513019A) and JP2007-279688A can be preferably used.

—Disk-Shaped Liquid Crystal Compound—

As the disk-shaped liquid crystal compound, for example, compounds described in JP2007-108732A and JP2010-244038A can be preferably used.

In a case where the disk-shaped liquid crystal compound is used in the optically-anisotropic layer, the liquid crystal compound 20 rises in the thickness direction in the optically-anisotropic layer, and the optical axis 22 derived from the liquid crystal compound is defined as an axis perpendicular to a disk surface, that is so-called, a fast axis.

The optically-anisotropic layer 14 can be formed by applying multiple layers of the liquid crystal composition to the alignment film 13.

The application of the multiple layers refers to repetition of the following processes including: preparing a first liquid crystal immobilized layer by applying the liquid crystal composition to the alignment film, heating the liquid crystal composition, cooling the liquid crystal composition, and irradiating the liquid crystal composition with ultraviolet light for curing; and preparing a second or subsequent liquid crystal immobilized layer by applying the liquid crystal composition to the liquid crystal immobilized layer, heating the liquid crystal composition, cooling the liquid crystal composition, and irradiating the liquid crystal composition with ultraviolet light for curing as described above. Even in a case where the optically-anisotropic layer 14 is formed by the application of the multiple layers such that the total thickness of the optically-anisotropic layer 14 is large, the alignment direction of the alignment film 13 can be reflected from a lower surface of the optically-anisotropic layer 14 to an upper surface thereof

[Action of Collecting Lens]

As described above, in a preferable aspect, the light deflection device 100 in the example shown in the drawing includes the collecting lens 131 on the upstream side of the liquid crystal optical phase modulation element 101.

The refraction of light from the optically-anisotropic layer 14 (liquid crystal diffraction element 121) gradually increases from the center toward the outside in the deflection direction.

On the other hand, light, that is, a light beam deflected from the light deflection device 100 is thick in practice. Therefore, to be exact, the amounts of refraction of light from the optically-anisotropic layer 14 on the inside (the center side of deflection) and the outside in the deflection direction are different from each other, and the amount of refraction on the outside is more than that on the inside. Therefore, the light refracted from the liquid crystal diffraction element 121 increases in diameter so as to be slightly diffused.

On the other hand, by providing the collecting lens 131 such that the light incident into the liquid crystal diffraction element 121 slightly decreases in diameter, light emitted from the light deflection device 100 (liquid crystal diffraction element 121) can be converted into parallel light to improve straightness.

As a result, by providing the collecting lens 131, the scanning of light using the light deflection device 100 can be accurately performed even in a case where an object to be scanned with light is distant from the light deflection device 100.

The refractive power (lens power) of the collecting lens 131 is not limited.

That is, the refractive power of the collecting lens 131 may be appropriately set to refractive power capable of emitting suitable light based on the amount of refraction from the liquid crystal diffraction element 121 and the in-plane distribution thereof (that is, an in-plane distribution function of a diffraction pitch), the deflection angle of light from the light deflection device 100, the distance between the light deflection device 100 and the object to be scanned with light, the diameter of incidence light (beam diameter), and the like.

In addition, the position of the collecting lens 131 is not particularly limited as long as it is present upstream of the liquid crystal diffraction element 121. From the viewpoint that, for example, the collecting lens 131 can be reduced and can be easily designed, it is preferable that the collecting lens 131 is provided upstream of the liquid crystal optical phase modulation element 101 (light deflection element).

FIG. 10 is a schematic plan view showing an optically-anisotropic layer in a design modification example of the liquid crystal diffraction element.

A liquid crystal alignment pattern in an optically-anisotropic layer 14A shown in FIG. 10 is different from the liquid crystal alignment pattern in the above-described optically-anisotropic layer 14. FIG. 10 shows only the optical axis 22. The optically-anisotropic layer 14A in FIG. 10 has the liquid crystal alignment pattern in which the direction of the optical axis 22 gradually changes while rotating in multiple directions from the center side toward the outside, for example along axes $A_1$, $A_2$, $A_3$, and . . . .

That is, the liquid crystal alignment pattern in the optically-anisotropic layer 14A shown in FIG. 10 is a liquid crystal alignment pattern in which the optical axis 22 rotates radially. In other words, the liquid crystal alignment pattern in the optically-anisotropic layer 14A shown in FIG. 10 is a concentric circular pattern having a concentric circular shape where the in-plane direction in which the direction of the optical axis changes while continuously rotating moves from an inside toward an outside.

Depending on the liquid crystal alignment pattern shown in FIG. 10, the absolute phase of incidence light changes by different amounts of change between local regions having different directions of the optical axes 22. In a case where the liquid crystal alignment pattern in which the optical axis radially changes while rotating as shown in FIG. 10 is provided, incidence light can be caused to transmit as diverging light or collected light. That is, a function as a convex lens or a concave lens can be implemented by the liquid crystal alignment pattern in the optically-anisotropic layer 14.

In a preferable aspect of the light deflection device according to the embodiment of the present invention, the liquid crystal diffraction element 121 is used for the function of the concave lens of the optically-anisotropic layer 14A shown in FIG. 10. At this time, in a case where the center of the lens is matched to the center of emitted light of the liquid crystal optical phase modulation element 101, the maximum deflection angle θmax of light emitted from the liquid crystal optical phase modulation element can be extended most efficiently.

It is preferable that, as the size of divided regions (for example, 121a to 121e) of the liquid crystal diffraction element 121 decreases, the change is more smooth. The beam diameter of laser light to be emitted may be a finite value to the extent that there is no problems in practice. For example, the beam diameter may be 10 to several hundreds of micrometers.

In the light deflection device according to the embodiment of the present invention, by using the liquid crystal diffraction element 121A for the function of the concave lens of the optically-anisotropic layer 14A shown in FIG. 10, light can be deflected so as to be radially diffused from the center.

Figure 16:
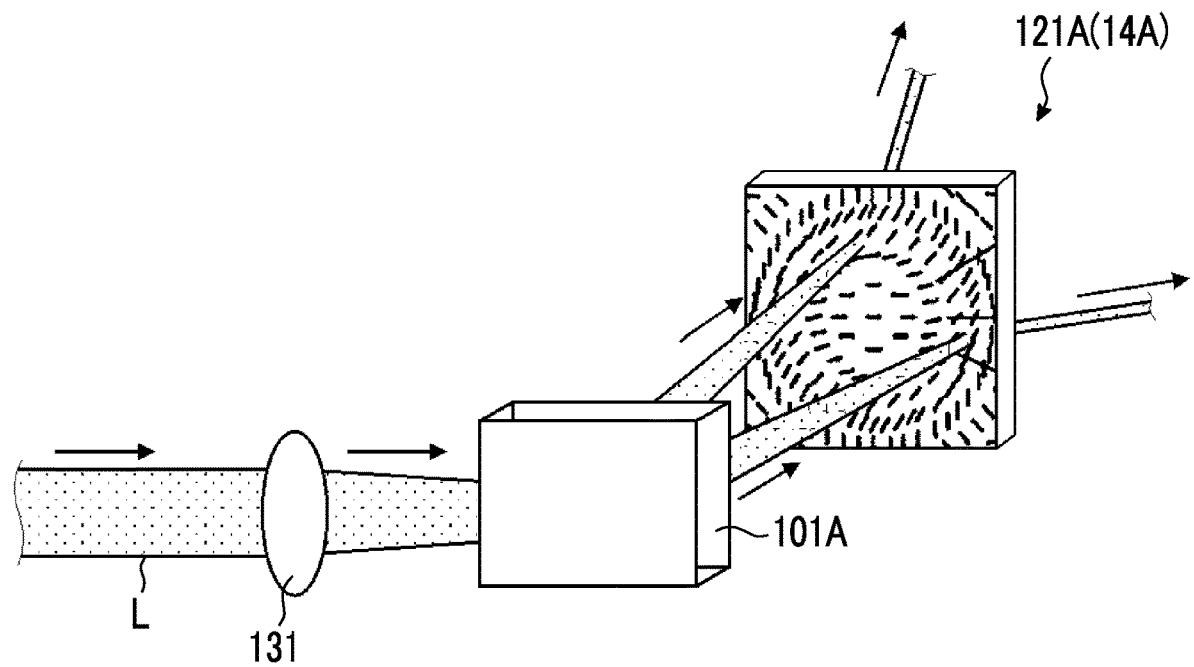
FIG. 16 is a conceptual diagram showing an action of an example of the light deflection device according to the present invention.

For example, in the light deflection device according to the embodiment of the present invention, as conceptually shown in FIG. 16, the liquid crystal diffraction element 121A including the optically-anisotropic layer 14A that functions as the concave lens, and, as the light deflection element, the light deflection element 101A that radially deflects light are used. The light deflection element 101A deflects light, for example, at an orientation of 360° and a polar angle of 0° to 35°.

As a result, as shown in FIG. 16, the light L radially deflected from the light deflection element 101A is refracted from the liquid crystal diffraction element 121A such that the deflection angle, that is, the azimuthal angle from the light deflection element 101A can be extended, and light can be deflected radially in a wide range. In addition, in a preferable aspect of the light deflection device according to the embodiment of the present invention, the collecting lens 131 is provided. The light L is incident into the light deflection element 101A as collected light and deflected by the collecting lens 131, and the collected light is incident into the liquid crystal diffraction element 121A as it is. As a result, the light refracted by the liquid crystal diffraction element 121A is deflected and emitted as parallel light.

Examples of the light deflection element 101A that radially deflects light include a well-known MEMS (Micro Electro Mechanical Systems) light deflection element (for example, a MEMS scanner (light scanner), a MEMS light deflector, a MEMS mirror, or a digital micromirror device (DMD)) that swings a mirror using a piezoelectric actuator to deflect light (deflection scanning), for example, a MEMS light deflection element described in JP2012-208352A, a MEMS light deflection element described in JP2014-134642A, or a MEMS light deflection element described in JP2015-022064A.

In the above-described example, the liquid crystal compound 20 of the liquid crystal diffraction element faces one side in the thickness direction, but the present invention is not limited thereto.

Figure 14:
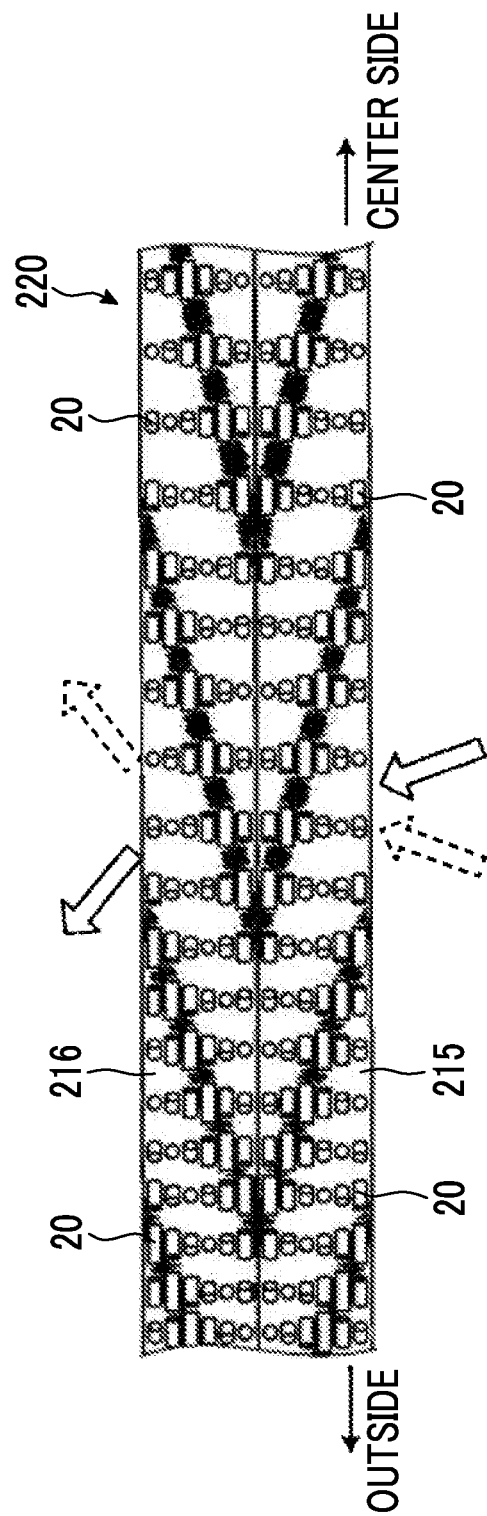
FIG. 14 is a conceptual diagram showing an optically-anisotropic layer according to an example of the present invention.

In the light deflection device according to the embodiment of the present invention, the optically-anisotropic layer forming the liquid crystal diffraction element may include the liquid crystal compound 20 that is twisted and aligned along a helical axis extending in the thickness direction as in a first optically-anisotropic layer 215 and a second optically-anisotropic layer 216 shown in FIG. 14. In the following description, the twisted alignment along the helical axis extending in the thickness direction will also simply referred to as "twisted alignment".

The first optically-anisotropic layer 215 and the second optically-anisotropic layer 216 in which the liquid crystal compound 20 is twisted and aligned are tilted optically-anisotropic layers in which, in a cross-sectional SEM image obtained by observing a cross-section of the liquid crystal diffraction element 220 with a scanning electron microscope (SEM), bright and dark lines derived from the twisted alignment of the liquid crystal compound 20 are tilted with respect to the normal line of an interface between the first optically-anisotropic layer 215 and the second optically-anisotropic layer 216 as shown in FIG. 14.

As described above, in the liquid crystal alignment pattern, in a case where the single period (rotation period p) over which the optical axis of the liquid crystal compound rotates by 180° gradually decreases in the direction in which the optical axis 22 rotates, the tilt angle of the bright and dark lines with respect to the normal line of the first optically-anisotropic layer 215 and the second optically-anisotropic layer 216 gradually decreases in the direction in which the optical axis 22 rotates. That is, in this case, the tilt angle of the bright and dark lines rises with respect to the main surface of the optically-anisotropic layer. Further, in this case, in the pattern of the bright and dark lines of the first optically-anisotropic layer 215 and the second optically-anisotropic layer 216, the period decreases in the direction in which the optical axis 22 rotates.

This way, in the optically-anisotropic layer including the twisted and aligned liquid crystal compound 20, the diffraction efficiency of light can be improved even by high-angle diffraction. As a result, as compared to the optically-anisotropic layer shown in FIG. 5 in which the liquid crystal compound is not twisted and aligned, a decrease in light amount in the optically-anisotropic layer can be suppressed, and the amount of emitted light can be improved.

In the liquid crystal diffraction element 220, the twisted direction in the twisted alignment of the liquid crystal compound 20 in the first optically-anisotropic layer 215 is different from that in the second optically-anisotropic layer 216. That is, in the first optically-anisotropic layer 215, the liquid crystal compound 20 is twisted and aligned clockwise in the light traveling direction. That is, in the second optically-anisotropic layer 216, the liquid crystal compound 20 is twisted and aligned counterclockwise in the light traveling direction.

Therefore, the direction of tilt of the bright and dark lines derived from the twisted alignment in the cross-sectional SEM image of the first optically-anisotropic layer 215 is different from that in the second optically-anisotropic layer 216.

In the first optically-anisotropic layer 215, for example, in a case where incidence light is right circularly polarized light, the effect of improving the diffraction efficiency is high for light that travels to the left side (outside) indicated by a solid line in the drawing. However, in the first optically-anisotropic layer 215, for example, in a case where incidence light is right circularly polarized light, the effect of improving the diffraction efficiency is low for light that travels to the right side (center side) indicated by a broken line in the drawing.

On the other hand, in the second optically-anisotropic layer 216, for example, in a case where incidence light is right circularly polarized light, conversely, the effect of improving the diffraction efficiency is low for light that travels to the left side (outside) indicated by a solid line in the drawing. However, in the second optically-anisotropic layer 216, in a case where incidence light is right circularly polarized light, the effect of improving the diffraction efficiency is high for light that travels to the right side (center side) indicated by a broken line in the drawing.

The effects are opposite in a case where incidence light is left circularly polarized light.

In the liquid crystal diffraction element 220, only the light that travels to the left side (outside) indicated by the solid line in the drawing is incident into a region in FIG. 14 where the center of deflection is on the right side in the drawing. Accordingly, for the light (right circularly polarized light), that is, in the region on the left side from the center in the drawing, the first optically-anisotropic layer 215 acts strongly, the diffraction efficiency is improved, and the amount of emitted light can be increased.

On the other hand, only the right that travels to the right side indicated by the broken line in the drawing is incident into the region on the right side from the center in FIG. 14. Accordingly, for the light (right circularly polarized light), the second optically-anisotropic layer 216 acts strongly, the diffraction efficiency is improved, and the amount of emitted light can be increased.

In addition, in the region at the center of polarization, the incidence angle of incidence light into the optically-anisotropic layer is small. Both the first optically-anisotropic layer 215 and the second optically-anisotropic layer 216 contribute to the improvement of the diffraction efficiency.

As a result, in the liquid crystal diffraction element 220 including the first optically-anisotropic layer 215 and the second optically-anisotropic layer 216 that have different twisted directions in the twisted alignment of the liquid crystal compound 20, the effect of improving the diffraction efficiency can be improved over the entire region in the light deflection direction, and a large amount of light can be emitted in the entire range of the deflection angle.

In the optically-anisotropic layer in which the liquid crystal compound 20 is twisted and aligned, the twisted angle of the liquid crystal compound is not limited. The twisted angle of liquid crystal compound may be appropriately set according to the deflection angle from the light deflection element, the desired diffraction efficiency, and the like.

In the optically-anisotropic layer in which the liquid crystal compound 20 is twisted and aligned, the twisted angle of the liquid crystal compound 20 is preferably 10° to 200°, more preferably 20° to 190°, and still more preferably 40° to 170°.

The twisted angle of the twisted and aligned liquid crystal compound 20 (the twisted angle in the thickness direction) refers to a twisted angle from a lower surface to an upper surface of the liquid crystal compound 20 that is twisted and aligned along the helical axis extending in the thickness direction in the optically-anisotropic layer.

Figure 15:
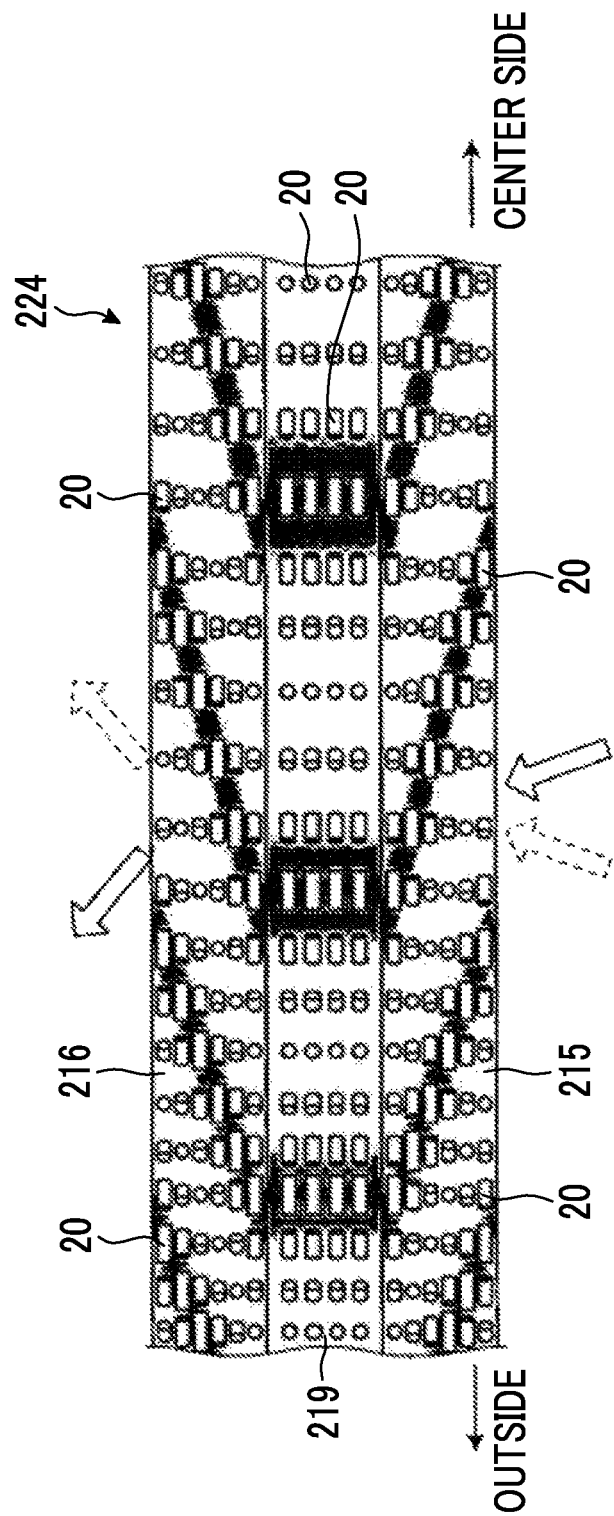
FIG. 15 is a conceptual diagram showing an optically-anisotropic layer according to an example of the present invention.

This way, in the liquid crystal diffraction element including the first optically-anisotropic layer 215 and the second optically-anisotropic layer 216 in which the liquid crystal compound 20 is helically twisted and aligned, a third optically-anisotropic layer 219 in which the liquid crystal compound 20 is not twisted and aligned may be provided between the first optically-anisotropic layer 215 and the second optically-anisotropic layer 216 as in a liquid crystal diffraction element 224 shown in FIG. 15.

The third optically-anisotropic layer 219 in which the liquid crystal compound is not twisted and aligned is a non-tilted optically-anisotropic layer in which bright and dark lines extend in the normal direction.

By providing the third optically-anisotropic layer 219 between the first optically-anisotropic layer 215 and the second optically-anisotropic layer 216, light can be deflected at a wider deflection angle due to the synergistic effect of diffraction from the third optically-anisotropic layer 219.

In the above description, the liquid crystal diffraction element 121 is used as a transmission diffraction element. However, in the light deflection device according to the embodiment of the present invention, a reflective liquid crystal diffraction element can also be used.

In this case, the same forming method can be adopted, except that the liquid crystal compositions are different from each other. By using a cholesteric liquid crystal as liquid crystal and using the same alignment film as that of the transmission diffraction element, reflective diffracted light can be generated, and the angle can be extended. As a light reflection element that reflects light in a direction different from the incidence angle, a micromirror or a microlens that collects or diffuses light or a light collecting mirror for a sensor can be used.

In the light deflection device according to the embodiment of the present invention, the light deflection element is not limited to the liquid crystal optical phase modulation element 101, and well-known various light deflection elements such as a galvanometer mirror, a polygon mirror, a MEMS light deflection element can be used.

In particular, from the viewpoint that the size of a mechanical movable portion and the number of mechanical movable portions are small, the above-described liquid crystal optical phase modulation element 101 and the MEMS light deflection element can be suitably used as the light deflection element.

Figure 13:
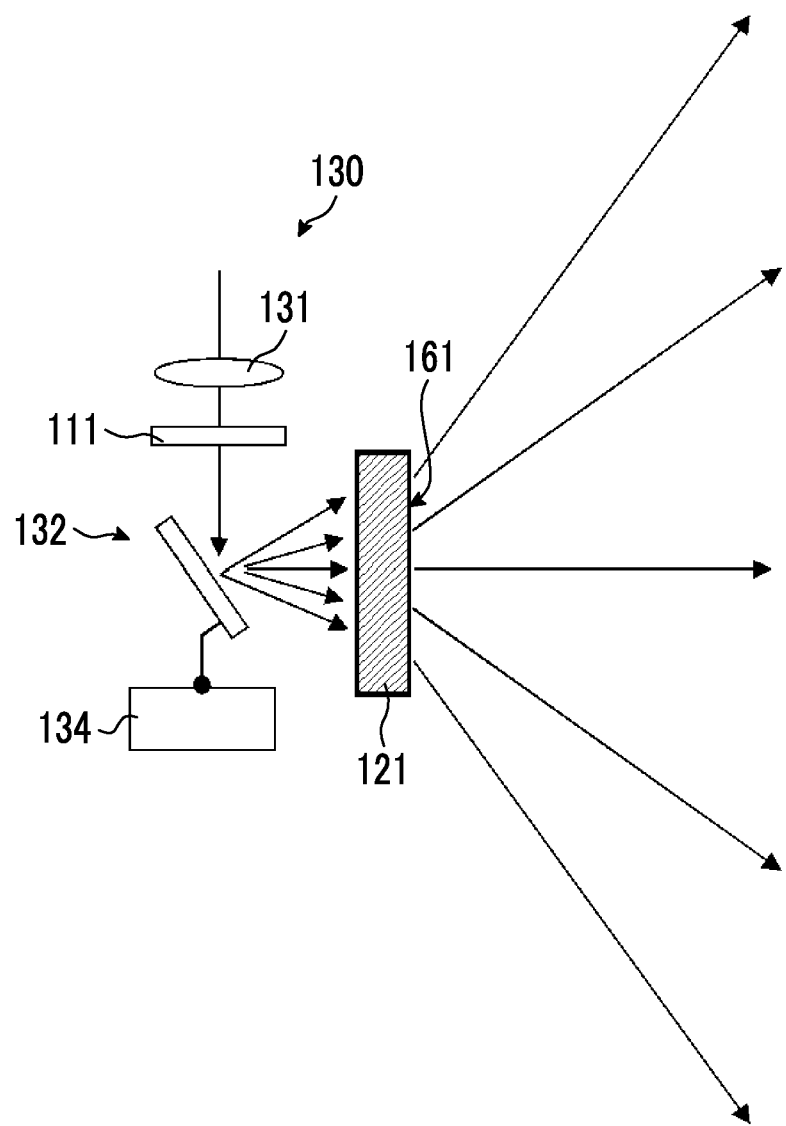
FIG. 13 is a conceptual diagram showing still another example of the light deflection device according to the present invention.

FIG. 13 conceptually shows an example of the light deflection device according to the embodiment of the present invention including the MEMS light deflection element.

In a light deflection device 130 shown in FIG. 13, a large number of members that are the same as those of the light deflection device 100 are used. Therefore, the same members are represented by the same reference numerals, and different members will be mainly described below.

In the light deflection device 130 shown in FIG. 13, P polarized light emitted from a light source (not shown) with respect to the emission surface 161 of the liquid crystal diffraction element 121 is slightly collected by the collecting lens 131 and is converted into, for example, right circularly polarized light by the λ/4 plate 111.

In the light deflection device 130 including the MEMS light deflection element 132, the λ/4 plate 111 may be disposed between the MEMS light deflection element 132 and the liquid crystal diffraction element 121 as in the light deflection device 100 shown in FIG. 1. However, for example, from the viewpoint that the λ/4 plate 111 can be reduced, in the light deflection device 130 including the MEMS light deflection element 132, it is preferable that the λ/4 plate 111 is provided upstream of the MEMS light deflection element 132.

In addition, in the light deflection device 130 including the MEMS light deflection element 132, in a case where circularly polarized light is incident the λ/4 plate 111 is not necessarily provided.

In the light deflection device 130, it is preferable that the mirror of the MEMS light deflection element 132 is not depolarized. Specifically, for example, a metal mirror having a mirror surface is used. In the metal mirror, in a case where circularly polarized light is reflected, the twisting (sense) of circularly polarized light is reversed. Therefore, in order to twist circularly polarized light in a desired direction during incidence into the liquid crystal diffraction element, it is preferable that circularly polarized light having an opposite twisted direction is incident into the MEMS light polarization element.

In a case where the incidence angle is large with respect to the mirror surface of the MEMS light deflection element 132, the polarization state of light changes because P polarized light (P wave) and S polarized light (S wave) have different reflectivities and different phases. Accordingly, the polarization state may be adjusted in advance such that desired circularly polarized light can be obtained after being reflected from the mirror. Examples of a method of adjusting the polarization state include a method of using elliptically polarized light. In addition, a phase difference plate for adjusting the phase may be disposed such that desired circularly polarized light can be obtained after being reflected from the mirror of the MEMS light deflection element 132.

Further, a circularly polarized light mirror, for example, a cholesteric liquid crystal layer may be used as the mirror of the MEMS light deflection element 132. In a circularly polarized light mirror, for example, a cholesteric liquid crystal layer, the twisted direction of circularly polarized light is maintained during reflection. Therefore, in order to twist circularly polarized light in a desired direction during incidence into the liquid crystal diffraction element 121, it is preferable that circularly polarized light having the same twisted direction is incident into the MEMS light polarization element 132.

Light that is converted into circularly polarized light by the λ/4 plate 111 is deflected from the MEMS light deflection element 132. The deflection direction of light from the MEMS light deflection element 132 matches the axis A direction (arrow X direction) as in the above-described light deflection device 100.

In FIG. 13, reference numeral 134 represents a drive unit of the MEMS light deflection element 132. As the drive unit 134, a well-known unit corresponding to the configuration of the MEMS light deflection element 132 and the like may be used.

In the light deflection device 130 according to the embodiment of the present invention, the MEMS light deflection element 132 is not particularly limited, and a well-known MEMS (Micro Electro Mechanical Systems) light deflection element (for example, a MEMS scanner (light scanner), a MEMS light deflector, a MEMS mirror, or a DMD) that swings a mirror using a piezoelectric actuator to deflect light (deflection scanning), for example, a MEMS light deflection element described in JP2012-208352A, a MEMS light deflection element described in JP2014-134642A, or a MEMS light deflection element described in JP2015-022064A can be used.

The light deflected from the MEMS light deflection element 132 is diffracted from the liquid crystal diffraction element 121 as in the light deflection device 100, the deflection angle is extended as described above, and the diffracted light is emitted from the light deflection device 130 at the desired maximum emission angle θmaxout that is more than the maximum deflection angle θmax of the MEMS light deflection element 132.

In the above description, in a preferable aspect of the light deflection device according to the embodiment of the present invention, the liquid crystal diffraction element 121 including the optically-anisotropic layer 14 having the liquid crystal alignment pattern in which a direction of an optical axis derived from the liquid crystal compound changes while continuously rotating in at least one in-plane direction is used as a diffraction element, but the present invention is not limited thereto.

That is, in the light deflection device according to the embodiment of the present invention, all the well-known diffraction elements can be used as long as the periodic structure pitch gradually changes such that the diffraction angle increases from the center of deflection from the light deflection element toward the outside.

In a preferable example, a method of using photonic crystal without using a liquid crystal material can also be used with the same principle as that of the above-described liquid crystal diffraction element.

For example, as in a method described in JP2017-111277A, a transparent substrate that is formed of an inorganic material and an uneven pattern forming portion that is formed of a plurality of protrusions formed of Si or the like are provided at a regular interval such that structural birefringence occurs and the azimuthal angle is changed in a plane. As a result, the same diffraction effect as that of the above-described liquid crystal alignment pattern can be obtained.

Examples of another preferable diffraction element include a hologram diffraction element that exposes a photosensitive material or the like to a pattern shape by holography and diffracts light according to a difference in the refractive index of the exposed portion.

The hologram diffraction element may have a periodic refractive index distribution that gradually changes from the center of deflection from the light deflection element toward both end portions such that the diffraction angle increases, for example, from the center of deflection from the light deflection element toward the outside.

The hologram diffraction element is not particularly limited as long as the above-described requirements are satisfied. For example, a well-known hologram diffraction element (holographic diffraction element (diffraction grating)) such as a hologram sheet described in JP2016-184124A or can be used.

As still another preferable diffraction element, a surface relief diffraction element that diffracts light with a fine uneven portion formed on the surface can also be used.

In the surface relief diffraction element, an uneven grating period (relief pattern) gradually changes from the center of deflection from the light deflection element toward both end portions such that the diffraction angle increases, for example, from the center of deflection from the light deflection element toward both end portions.

The surface relief diffraction element is not particularly limited as long as the above-described requirements are satisfied. For example, all the well-known surface relief diffraction elements such as a structure described in JP2015-093439A can be used.

In a case where the hologram diffraction element or the surface relief diffraction element is used as the diffraction element, light incident into the diffraction element is not necessarily circularly polarized light. Accordingly, in this case, the λ/4 plate 111 is unnecessary.

As can be seen from the above description, the light deflection device according to the embodiment of the present invention can realize a light and small light deflection device that has a simple structure, can be easily driven, has no mechanical movable portion, and thus is suitable for free-space optical communication, a laser radar, or an light scanner where light can be deflected at a large angle.

The light deflection device according to the embodiment of the present invention can realize a high-performance light deflection device having a simple configuration using a simple driving method.

The light deflection device according to the embodiment of the present invention can be used in various optical devices.

Figure 17:
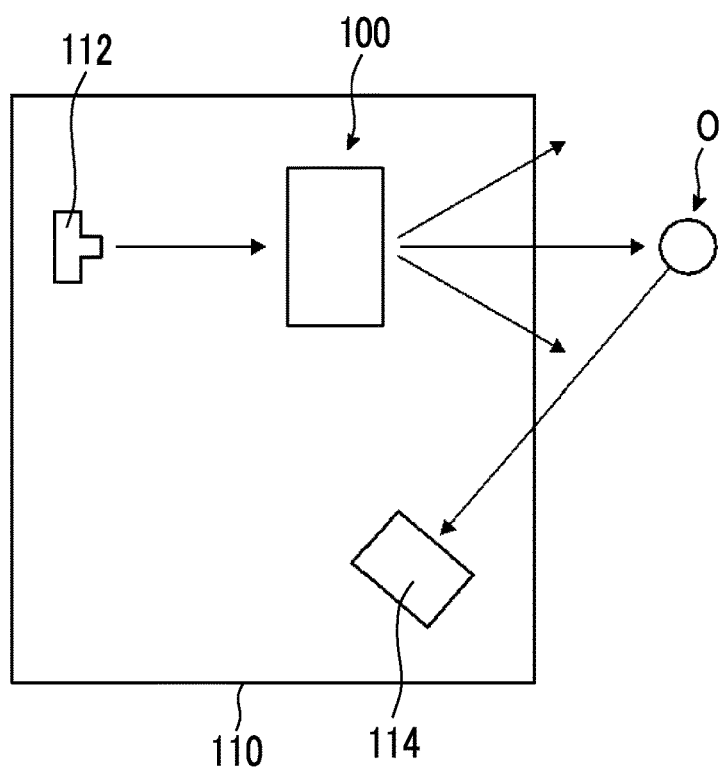
FIG. 17 is a diagram conceptually showing an example of an optical device according to the present invention.

FIG. 17 conceptually shows an example of an optical device according to the embodiment of the present invention including the light deflection device according to the embodiment of the present invention.

An optical device 110 shown in FIG. 17 includes a light source 112, the light deflection device 100 according to the embodiment of the present invention, and a light-receiving element 114.

In the optical device 110, light emitted from the light source 112 is deflected from the light deflection device 100 according to the embodiment of the present invention. The deflected light is emitted from the optical device 110 and reflected from a measurement target O. The reflected light from the measurement target O is incident again into the optical device 110, is received by the light-receiving element 114, and is measured.

The optical device 110 according to the embodiment of the present invention is used as various sensors. Examples of the sensors using the optical device 110 include a distance-measuring sensor using light detection and ranging (LiDAR), a shape-measuring sensor, and a recognition sensor.

In the optical device 110, the light source 112 is not particularly limited, and an appropriate light source may be selected depending on the measurement target, the use of the optical device 110, and the like. Examples of the light source 112 include a semiconductor laser, a laser diode (LD), and a light emitting diode (LED). For example, in a case where the optical device 110 is used as a distance-measuring sensor, for example, a light source that emits infrared light is preferably used as the light source 112. In addition, depending on targets to be measured and environments, for example, a light source that emits light having a wavelength other than infrared light or an electromagnetic wave can also be preferably used. For example, a laser light source that emits visible light may be used as the light source 112.

The light-receiving element 114 is not particularly limited, and various well-known light-receiving elements can be used as long as they can measure light emitted from the light source 112. Examples of the light-receiving element 114 include a charge coupled device (CCD) sensor and a photomultiplier.

In addition, the light deflection device according to the embodiment of the present invention has a simple structure, can be easily driven, and can deflect light at a large angle. Therefore, the light deflection device according to the embodiment of the present invention can be used for various uses where a reduction in weight and size is desired and light is scanned.

Examples of the uses of the light deflection device according to the embodiment of the present invention include a drawing device using beam scanning, a beam scanning projection display, a beam scanning head-up display, and beam scanning AR glasses. In this case, the light deflection device according to the embodiment of the present invention can be used as a device that deflects light in a wide wavelength range including visible light.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of Liquid Crystal Optical Phase Modulation Element>

As the liquid crystal optical phase modulation element, an element described in JP2003-295153A was used.

That is, in the liquid crystal optical phase modulation element a nematic liquid crystal layer is provided between a transparent substrate including a plurality of individual ITO electrodes arranged in a parallel stripe shape and a transparent substrate including a common ITO electrode formed of a transparent conductor. By applying a predetermined voltage to each of the individual electrodes, the modulation of the refractive index occurred in the nematic liquid crystal layer.

As a result, it was verified that infrared laser light (wavelength: 940 nm; linearly polarized light; the orientation of the polarizing axis was extraordinary light orientation of liquid crystal) was bent to an orientation perpendicular to the orientation of the parallel stripe belt. The deflection angle was about ±3°.

<Preparation of Liquid Crystal Diffraction Element>

(Support and Saponification Treatment of Support)

As the support, a commercially available triacetyl cellulose film (manufactured by Fuji Film Co., Ltd., Z-TAC) was used.

The support was caused to pass through an induction heating roll at a temperature of 60° C. such that the support surface temperature was increased to 40° C.

Next, an alkali solution shown below was applied to a single surface of the support using a bar coater in an application amount of 14 mL (liter)/m², the support was heated to 110° C., and the support was transported for 10 seconds under a steam infrared electric heater (manufactured by Noritake Co., Ltd.).

Next, 3 mL/m² of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

Alkali Solution

| Potassium hydroxide | 4.70 parts by mass |
| Water | 15.80 parts by mass |
| Isopropanol | 63.70 parts by mass |

| Surfactant SF-1: $C_{14}H_{29}O(CH_2CH_2O)2OH$ | 1.0 part by mass |
| Propylene glycol | 14.8 parts by mass |

(Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

Undercoat Layer-Forming Coating Solution

| The following modified polyvinyl alcohol | 2.40 parts by mass |
| Isopropyl alcohol | 1.60 parts by mass |
| Methanol | 36.00 parts by mass |
| Water | 60.00 parts by mass |

Modified Polyvinyl Alcohol

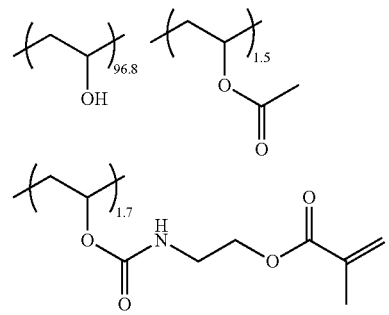

(Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

Alignment Film-Forming Coating Solution

| Material A for photo-alignment | 1.00 part by mass |
| Water | 16.00 parts by mass |
| Butoxyethanol | 42.00 parts by mass |
| Propylene glycol monomethyl ether | 42.00 parts by mass |

—Material A for Photo-Alignment—

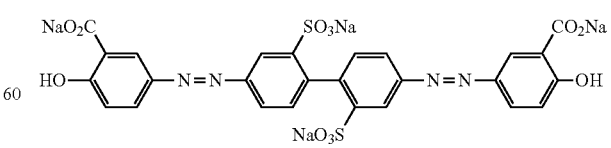

(Exposure of Alignment Film)

The alignment film was exposed using the exposure device shown in FIG. 12 to form an alignment film P-1 having an alignment pattern.

In the exposure device, a laser that emits laser light having a wavelength (405 nm) was used as the laser. The exposure dose of the interference light was 100 mJ/cm².

By adjusting the refractive power of the lens (convex lens), during the subsequent formation of the optically-anisotropic layer, the rotation period of the optical axis of the liquid crystal compound in the optically-anisotropic layer gradually decreased from the center toward the outside.

(Formation of Optically-Anisotropic Layer)

As the liquid crystal composition forming the optically-anisotropic layer, the following composition A-1 was prepared.

Composition A-1

| | |
|---|---|
| Liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 313.00 parts by mass |

Liquid Crystal Compound L-1

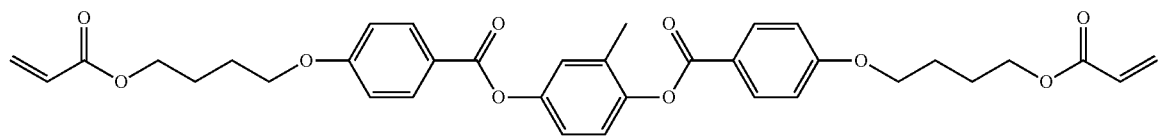

84%

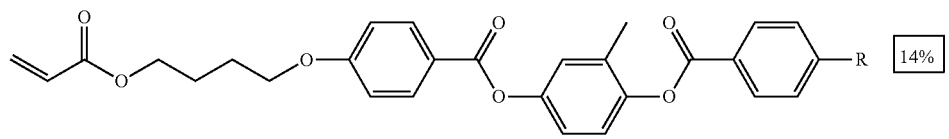

14%

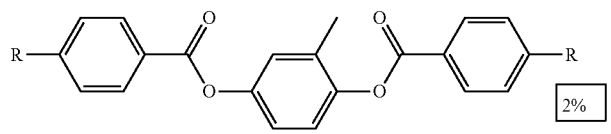

2%

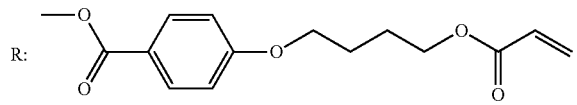

Leveling Agent T-1

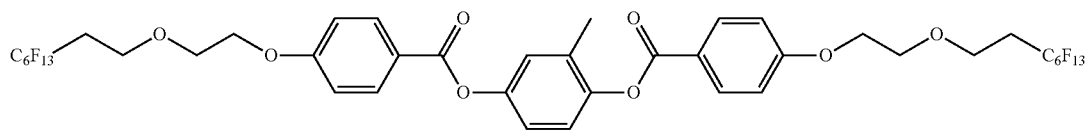

The optically-anisotropic layer was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the composition A-1 was applied to the alignment film P-1 to form a coating film, the coating film was heated using a hot plate at 70° C., the coating film was cooled to 25° C., and the coating film was irradiated with ultraviolet light having a wavelength of 365 nm at an irradiation dose of 100 mJ/cm$^2$ using a high-pressure mercury lamp in a nitrogen atmosphere. As a result, the alignment of the liquid crystal compound was immobilized. At this time, the thickness of the first liquid crystal layer was 0.2 μm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, an optically-anisotropic layer was obtained. As a result, a liquid crystal diffraction element including the support, the alignment film, and the optically-anisotropic layer was prepared.

In the optically-anisotropic layer, finally, $\Delta n_{940} \times$ Thickness (Re(940)) of the liquid crystal was 470 nm, and a periodic liquid crystal alignment pattern having a concentric circular shape as shown in FIG. 10 was provided. Further it was verified with a polarizing microscope that the rotation period of the optical axis of the liquid crystal compound in the optically-anisotropic layer gradually decreased from the center toward the outside in the in-plane direction in which the optical axis rotated and that the rotation direction of the optical axis was reversed at the center.

In the liquid crystal alignment pattern of the optically-anisotropic layer, regarding the rotation period (single period) over which the optical axis of the liquid crystal compound rotated by 180°, the rotation period of a center portion was significantly large (the inverse of the rotation period was 0), the rotation period of a portion at a distance of 2.5 mm from the center was 10.6 μm, and the rotation period of a portion at a distance of 5.0 mm from the center was 5.3 μm. This way, the rotation period gradually decreased from the center toward the outer direction.

<Preparation of λ/4 Plate>

In order to convert linearly polarized light transmitted through the liquid crystal optical phase modulation element into circularly polarized light and to be incident into the liquid crystal diffraction element, a λ/4 plate (circular polarization plate) was prepared.

First, the support on which the undercoat layer was formed as described above was prepared.

(Formation of Alignment Film P-10)

The following alignment film P-10-forming coating solution was continuously applied to the support on which the undercoat layer was formed using a #2.4 wire bar. The support on which the coating film of the alignment film P-10-forming coating solution was formed was dried using a hot plate at 80° C. for 5 minutes. As a result, an alignment film P-10 was formed.

<Alignment Film P-10-Forming Coating Solution>

| | |
|---|---|
| Material for photo-alignment Polymer A2 | 4.35 parts by mass |
| Low molecular weight compound B2 | 0.80 parts by mass |
| Crosslinking agent C1 | 2.20 parts by mass |
| Compound D1 | 0.48 parts by mass |
| Compound D2 | 1.15 parts by mass |
| Butyl acetate | 100.00 parts by mass |

<<Synthesis of Polymer A2>>

100 parts by mass of 2-(3,4-epoxycyclohexyl)ethyltrimethoxysilane, 500 parts by mass of methyl isobutyl ketone, and 10 parts by mass of triethylamine were charged into a reaction vessel equipped with a stirrer, a thermometer, a dropping funnel, and a reflux cooling pipe and were mixed with each other at room temperature. Next, 100 parts by mass of deionized water was dropped for 30 minutes using a dropping funnel, and a reaction was caused to occur at 80° C. for 6 hours while mixing the components with each other under reflux. After completion of the reaction, the organic phase was extracted and was cleaned with 0.2 mass % ammonium nitrate aqueous solution until water used for cleaning was neutral. Next, by distilling off the solvent and water under reduced pressure, epoxy-containing polyorganosiloxane was obtained as a viscous transparent liquid In a case where the epoxy-containing polyorganosiloxane was analyzed by nuclear magnetic resonance ($^1$H-NMR), a peak having a theoretical intensity based on an oxiranyl group was obtained in the vicinity of chemical shift (δ)=3.2 ppm, and it was verified that a side reaction of an epoxy group did not occur during the reaction. In the epoxy-containing polyorganosiloxane, the weight-average molecular weight Mw was 2,200, and the epoxy equivalent was 186 g/mol.

Next, 10.1 parts by mass of the epoxy-containing polyorganosiloxane obtained as described above, 0.5 parts by mass of an acrylic group-containing carboxylic acid (manufactured by Toagosei Co., Ltd., ARONIX M-5300, ω-carboxypolycaprolactone monoacrylate (polymerization degree n 2)), 20 parts by mass of butyl acetate, 1.5 parts by mass of a cinnamic acid derivative obtained using a method of Synthesis Example 1 of JP2015-026050A, and 0.3 parts by mass of tetrabutylammonium bromide were charged into a 100 mL three-neck flask, and were stirred at 90° C. for 12 hours. After completion of the reaction solution was diluted with the same amount (mass) of butyl acetate as that of the reaction solution and was cleaned with water three times.

An operation of concentrating this solution and diluting the concentrated solution with butyl acetate was repeated twice. Finally, a solution including polyorganosiloxane (the following polymer A2) having a photo-alignable group was obtained. In the polymer A2, the weight-average molecular weight Mw was 9,000. In addition, as a result of $^1$H-NMR, the content of a component having a cinnamate group in the polymer A2 was 23.7 mass %.

—Polymer A2—

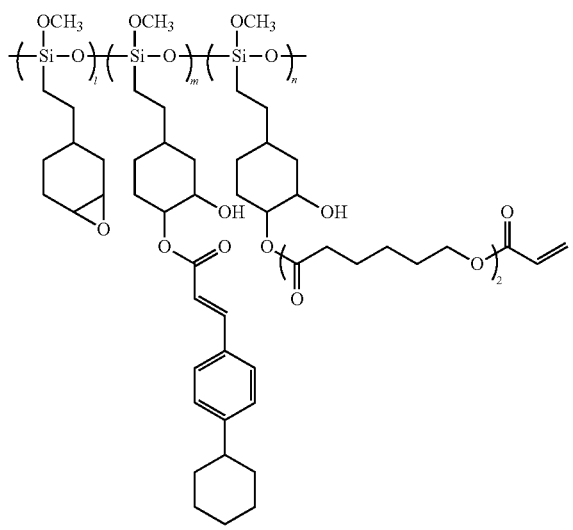

—Low Molecular Weight Compound B2—

The low molecular weight compound B2 shown in the following table (manufactured by Nissin Ion Equipment Co., Ltd., NOMCOAT TAB) was used.

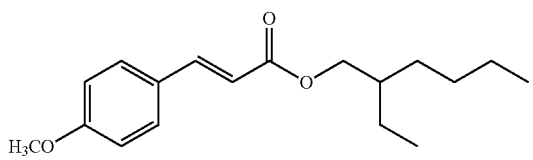

—Crosslinking Agent C1—

The crosslinking agent C1 (manufactured by Nagase ChemteX Corporation, DENACOL EX411) shown in the following table was used.

[Chem. 7]

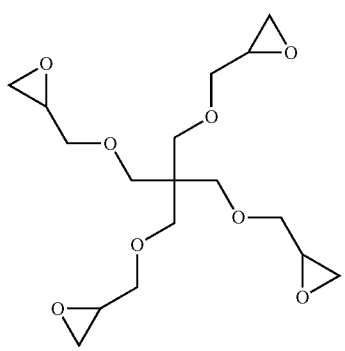

—Compound D1—

The following compound D1 (manufactured by Kawaken Fine Chemicals Co., Ltd., ALUMINUM CHELATE A(W)) shown in the following table was used.

[Chem. 8]

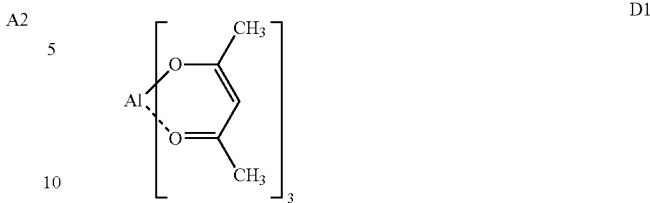

—Compound D2—

The compound D2 (manufactured by Toyo Science Corp., triphenylsilanol) shown in the following table was used.

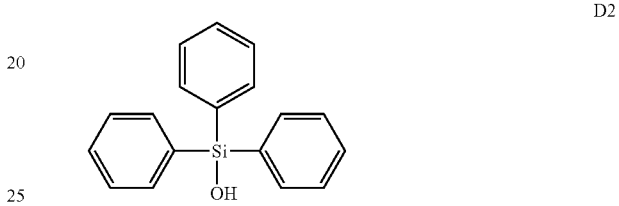

(Exposure of Alignment Film P-10)

By irradiating the obtained alignment film P-10 with polarized ultraviolet light (20 mJ/cm$^2$, using an extra high pressure mercury lamp), the alignment film P-10 was exposed.

[Preparation of λ/4 Plate]

The optically-anisotropic layer was formed by applying the composition A-1 to the alignment film P-10.

The applied coating film was heated using a hot plate at 110° C., the coating film was cooled to 60° C., and the coating film was irradiated with ultraviolet light having a wavelength of 365 nm at an irradiation dose of 500 mJ/cm$^2$ using a high-pressure mercury lamp in a nitrogen atmosphere. As a result, the alignment of the liquid crystal compound was immobilized, and an optically-anisotropic layer was prepared. Finally, the optically-anisotropic layer was transferred from the support to a quartz substrate having a thickness of 10 mm using an adhesive material. As a result, the λ/4 plate was obtained. In the obtained λ/4 plate, $\Delta n_{940} \times d$ (Re(940)) was 470 nm.

<Assembly of Light Deflection Device>

The liquid crystal optical phase modulation element, the λ/4 plate, and the liquid crystal diffraction element were laminated in this order and were bonded to each other using an adhesive material. As a result, a light deflection device shown in FIG. 1 was prepared. In addition, a drive unit was connected to the liquid crystal optical phase modulation element.

At this time, the deflection orientation of emitted light of the liquid crystal optical phase modulation element and the in-plane slow axis of the λ/4 plate were disposed to intersect at 45° such that the light was converted into circularly polarized light. In addition, the center of the deflection orientation of the liquid crystal optical phase modulation element and the center of the liquid crystal diffraction element were matched to each other, and the elements were bonded to each other such that the amplification effect of the deflection angle of light was able to be maximized.

In addition, as a light source, an infrared laser (wavelength: 940 nm; linearly polarized light; the orientation of the polarizing axis was extraordinary light orientation of liquid crystal) was prepared. The infrared laser was disposed such that linearly polarized light to be emitted was P polarized light with respect to the emission surface of the liquid crystal diffraction element.

[Evaluation]

In the light deflection device according to Example 1, the infrared laser light was incident from the front of the liquid crystal optical phase modulation element in the light deflection device, a predetermined voltage was applied to the individual electrodes such that the liquid crystal optical phase modulation element was changed at an angle of ±3°, and the angle of emitted light from the liquid crystal diffraction element was measured.

As a result, it was able to be verified that the deflection angle (amount of deflection angle) from the liquid crystal optical phase modulation element was largely extended by the liquid crystal diffraction element by about ±55°.

In addition, a collecting lens (convex lens) was disposed between the infrared laser and the liquid crystal optical phase modulation element in the light deflection device, and the same evaluation was performed. As a result, it was able to be verified that the straightness of light deflected from the light deflection device was improved.

Example 2

A light deflection device having the configuration shown in FIG. 13 was prepared by using the micromirror device described in JP2014-134642A as the light deflection element instead of the liquid crystal optical phase modulation element, and the same evaluation was performed.

In this example, the liquid crystal diffraction element was also changed to the following element. A method of preparing the liquid crystal diffraction element was as follows.

<Preparation of Liquid Crystal Diffraction Element>

0.09 parts by mass of the following chiral agent was added to the above-described composition A-1 to prepare a composition. An optically-anisotropic layer was formed using the same method as described above, except that the composition was used. $\Delta n_{940} \times$thickness (Re(940)) was 470 nm, and the twisted angle was 75° of the right twisting.

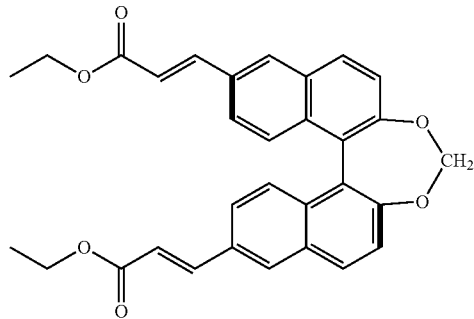

Next, 0.09 parts by mass of the following chiral agent was added to the above-described composition A-1 to prepare a composition. The second optically-anisotropic layer was formed on the previously formed optically-anisotropic layer using the same method as described above, except that the composition was used. $\Delta n_{940} \times$thickness (Re(940)) was 470 nm, and the twisted angle was 75° of the left twisting.

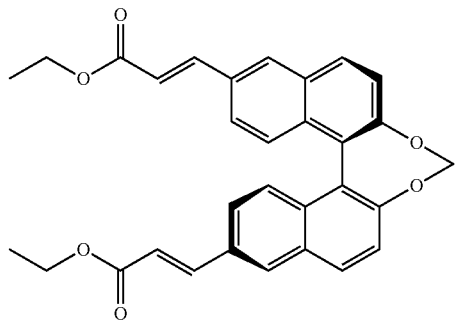

As a result, a liquid crystal diffraction element in which two layers were laminated was prepared, the two layers having a structure in which the liquid crystal compound was twisted and aligned and the twisted directions were different from each other as shown in FIG. 14. The reason why the layers having different twisted directions were laminated was to obtain a high diffraction efficiency even by high-angle diffraction as described above.

The characteristic values of each of the other optical components shown in FIG. 13 are as described below.

The diameter of the laser light was 3 mm, the focal length of the collecting lens was 35 mm, the distance between the collecting lens and the micromirror device was 16 mm, and the distance between the micromirror device and the liquid crystal diffraction element was 7 mm.

The deflection angle of emitted light from the micromirror device was ±35°.

The diameter of the liquid crystal diffraction element was 20 mm. In the liquid crystal alignment pattern of the liquid crystal diffraction element, the rotation period of a center portion was significantly large (the inverse of the rotation period was 0), the rotation period at a position of a radius of 5 mm was 4.8 μm, and the rotation period at a position of a radius of 10 mm was 2.6 μm. This way, the rotation period gradually decreased from the center toward the outer direction.

Regarding the light deflection device according to Example 2, the angle of emitted light from the liquid crystal diffraction element was measured and evaluated using the same method as that of Example 1.

In the evaluation, likewise, it was verified that the deflection angle from the micromirror device was largely extended by the liquid crystal diffraction element, and the light was emitted at a deflection angle of about ±70°.

Further, two light deflection devices including a liquid crystal diffraction element different from that of the above-described example were prepared.

Example 3

<Preparation of Liquid Crystal Diffraction Element>

As conceptually shown in FIG. 14, a liquid crystal diffraction element including two optically-anisotropic layers of a first optically-anisotropic layer and a second optically-anisotropic layer was prepared.

The first optically-anisotropic layer and the second optically-anisotropic layer are layers where the liquid crystal compound is twisted and aligned, and are tilted optically-anisotropic layers in which, in a cross-sectional SEM image obtained by observing a cross-section of the liquid crystal diffraction element with a SEM, bright and dark lines derived from the twisted alignment of the liquid crystal compound were tilted with respect to the normal line of an interface between the first optically-anisotropic layer and the second optically-anisotropic layer as shown in FIG. 14.

Further, the twisted direction in the twisted alignment of the liquid crystal compound of the first optically-anisotropic layer was different from that of the second optically-anisotropic layer. As a result, the tilt directions of the bright and dark lines derived from the twisted alignment in the cross-sectional SEM images were different from each other.

In the following description, "the bright and dark lines derived from the twisted alignment" will also be simply referred to as "bright and dark lines". In addition, "the normal line of the interface between the first optically-anisotropic layer and the second optically-anisotropic layer" will also be simply referred to as "normal line".

(Formation of First Optically-Anisotropic Layer)

As the liquid crystal composition forming the first optically-anisotropic layer, the following composition A-5 was prepared.

Composition A-5

| | |
|---|---|
| Liquid crystal compound L-1 | 100.00 parts by mass |
| Chiral agent A | 0.13 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2840.00 parts by mass |

Chiral Agent A

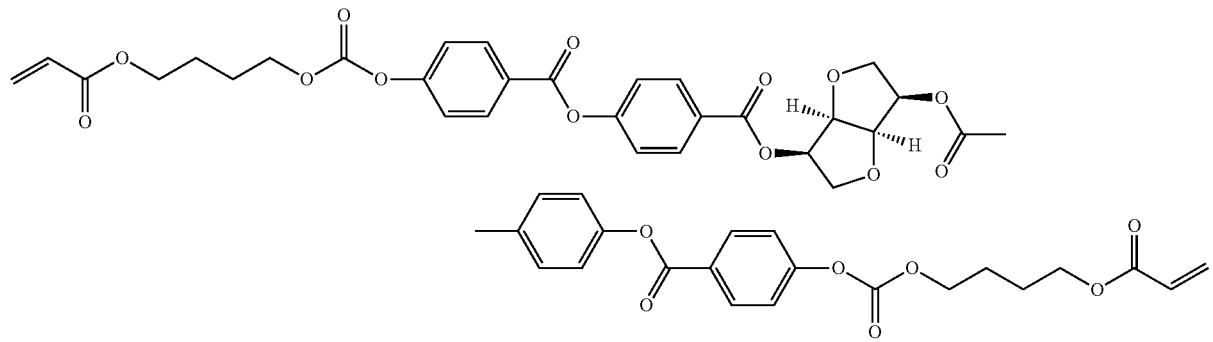

A first optically-anisotropic layer was formed on the alignment film P-1 using the same method as that of the optically-anisotropic layer according to Example 1, except that the composition A-5 was used.

(Formation of Second Optically-Anisotropic Layer)

As the liquid crystal composition forming the second optically-anisotropic layer, the following composition A-6 was prepared.

Composition A-6

| | |
|---|---|
| Liquid crystal compound L-1 | 100.00 parts by mass |
| Chiral agent B | 0.22 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2840.00 parts by mass |

Chiral Agent B

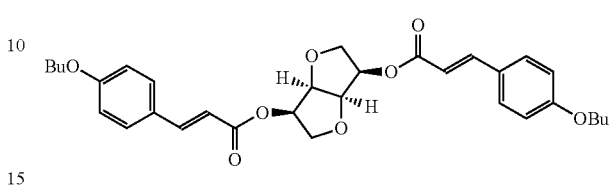

A second optically-anisotropic layer was formed on the first optically-anisotropic layer 1 using the same method as that of the optically-anisotropic layer according to Example 1, except that the composition A-6 was used. As a result, a liquid crystal diffraction element including two optically-anisotropic layers as shown in FIG. 14 was prepared.

In the first optically-anisotropic layer and the second optically-anisotropic layer of the prepared liquid crystal diffraction element, finally, $\Delta n_{940} \times$ Thickness ($=Re(940)$) of the liquid crystal was 470 nm, and a periodic liquid crystal alignment pattern having a concentric circular shape as shown in FIG. 10 was provided. Further it was verified with a polarizing microscope that the rotation period of the optical axis of the liquid crystal compound gradually decreased from the center toward the outside in the in-plane direction in which the optical axis rotated and that the rotation direction of the optical axis was reversed at the center.

In the liquid crystal alignment pattern of the first optically-anisotropic layer, regarding the rotation period (single period) over which the optical axis of the liquid crystal compound rotated by 180°, the rotation period of a center portion was significantly large (the inverse of the rotation period was considered 0), the rotation period of a portion at a distance of 1.0 mm from the center was 9.0 μm, the rotation period of a portion at a distance of 2.5 mm from the center was 4.5 μm, and the rotation period of a portion at a distance of 4.0 mm from the center was 3.0 μm. This way, the rotation period gradually decreased from the center toward the outer direction.

Further, the twisted direction in the liquid crystal compound of the first optically-anisotropic layer was opposite to that of the second optically-anisotropic layer. The twisted angle of the first optically-anisotropic layer in the thickness direction was 80° of the right twisting. On the other hand, the twisted angle in the thickness direction of the second optically-anisotropic layer was 80° of the left twisting.

In the cross-sectional SEM image of the liquid crystal diffraction element, in the first optically-anisotropic layer and the second optically-anisotropic layer, bright and dark lines obliquely tilted with respect to the normal line were observed. In addition, the tilt direction of the bright and dark lines of the first optically-anisotropic layer with respect to the normal line was opposite to that of the second optically-anisotropic layer. As described above, the normal line was the normal line of the interface between the first optically-anisotropic layer and the second optically-anisotropic layer.

In the first optically-anisotropic layer and the second optically-anisotropic layer, the tilt angle of the bright and dark lines with respect to the normal line gradually decreased from the center toward the outside. Further in the pattern of the bright and dark lines of the first optically-anisotropic layer and the second optically-anisotropic layer, a state where the period decreased from the center toward the outside was observed.

<Preparation of Light Deflection Device>

A light deflection device was prepared using the same method as that of Example 2, except that the liquid crystal diffraction element was changed to the liquid crystal diffraction element including two optically-anisotropic layers of the first optically-anisotropic layer and the second optically-anisotropic layer.

Example 4

<Preparation of Liquid Crystal Diffraction Element>

As conceptually shown in FIG. 15, a liquid crystal diffraction element three optically-anisotropic layers in which a third optically-anisotropic layer was provided between the first optically-anisotropic layer and the second optically-anisotropic layer was prepared.

The first optically-anisotropic layer and the second optically-anisotropic layer were layers in which the liquid crystal compound was twisted and aligned. Therefore, the first optically-anisotropic layer and the second optically-anisotropic layer were tilted optically-anisotropic layers in which the bright and dark lines in the cross-sectional SEM image were tilted with respect to the normal line as shown in FIG. 15.

Further, the twisted direction in the twisted alignment of the liquid crystal compound of the first optically-anisotropic layer was different from that of the second optically-anisotropic layer. As a result, the tilt directions of the bright and dark lines derived from the twisted alignment in the cross-sectional SEM images were different from each other.

On the other hand, the third optically-anisotropic layer disposed between the first optically-anisotropic layer and the second optically-anisotropic layer was a non-tilted optically-anisotropic layer in which the liquid crystal compound was not twisted and aligned and the bright and dark lines extended in the normal direction. As described above, the normal line was the normal line of the interface between the first optically-anisotropic layer and the second optically-anisotropic layer.

As described above, the twisted direction in the twisted alignment of the liquid crystal compound of the first optically-anisotropic layer was different from that of the second optically-anisotropic layer. As a result, the tilt directions of the bright and dark lines derived from the twisted alignment in the cross-sectional SEM images were different from each other.

(Formation of First Optically-Anisotropic Layer)

As the liquid crystal composition forming the first optically-anisotropic layer, the following composition A-7 was prepared.

Composition A-7

| | |
|---|---|
| Liquid crystal compound L-1 | 100.00 parts by mass |
| Chiral agent A | 0.19 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2840.00 parts by mass |

A first optically-anisotropic layer was formed on the alignment film P-1 using the same method as that of the optically-anisotropic layer according to Example 1, except that the composition A-7 was used.

(Formation of Third Optically-Anisotropic Layer)

The third optically-anisotropic layer 3 was formed on the first optically-anisotropic layer by applying the above-described composition A-1 using the same method as that of the optically-anisotropic layer according to Example 1, except that the thickness was changed.

Formation of Second Optically-Anisotropic Layer)

As the liquid crystal composition forming the second optically-anisotropic layer, the following composition A-8 was prepared.

Composition A-8

| | |
|---|---|
| Liquid crystal compound L-1 | 100.00 parts by mass |
| Chiral agent B | 0.32 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2840.00 parts by mass |

A second optically-anisotropic layer was formed on the third optically-anisotropic layer using the same method as that of the optically-anisotropic layer according to Example 1, except that the composition A-8 was used. As a result, a liquid crystal diffraction element including three optically-anisotropic layers as shown in FIG. 15 was prepared.

In the prepared liquid crystal diffraction element, in the first optically-anisotropic layer and the second optically-anisotropic layer, finally, $\Delta n_{940} \times$Thickness (Re(940)) of the liquid crystal was 470 nm, and in the third optically-anisotropic layer, $\Delta n_{940} \times$Thickness (Re(940)) of the liquid crystal was 564 nm.

In the first optically-anisotropic layer, the second optically-anisotropic layer, and the third optically-anisotropic layer, a periodic liquid crystal alignment pattern having a concentric circular shape as shown in FIG. 10 was provided. Further it was verified with a polarizing microscope that the rotation period of the optical axis of the liquid crystal compound gradually decreased from the center toward the outside in the in-plane direction in which the optical axis rotated and that the rotation direction of the optical axis was reversed at the center.

In the horizontal rotation alignment pattern of the first optically-anisotropic layer, regarding the rotation period (single period) over which the optical axis of the liquid crystal compound rotated by 180°, the rotation period of a center portion was significantly large (the inverse of the rotation period was considered 0), the rotation period of a portion at a distance of 1.0 mm from the center was 9.0 µm, the rotation period of a portion at a distance of 2.5 mm from the center was 4.5 µm, and the rotation period of a portion at a distance of 4.0 mm from the center was 3.0 µm. This way, the rotation period gradually decreased from the center toward the outer direction.

Further, the twisted direction in the liquid crystal compound of the first optically-anisotropic layer was opposite to that of the second optically-anisotropic layer. In addition, the twisted angle of the first optically-anisotropic layer in the thickness direction was 130° of the right twisting. The twisted angle of the third optically-anisotropic layer in the thickness direction was 0°. The twisted angle of the second optically-anisotropic layer in the thickness direction was 130° of the left twisting.

In the cross-sectional SEM image of the liquid crystal diffraction element, in the first optically-anisotropic layer and the second optically-anisotropic layer, bright and dark lines obliquely tilted with respect to the normal line were observed. In the third optically-anisotropic layer, bright and dark lines extending along the normal were observed along the normal line. The tilt direction of the bright and dark lines of the first optically-anisotropic layer with respect to the normal line was opposite to that of the second optically-anisotropic layer. As described above, the normal line was the normal line of the interface between the first optically-anisotropic layer and the second optically-anisotropic layer.

In the first optically-anisotropic layer and the second optically-anisotropic layer, the tilt angle of the bright and dark lines with respect to the normal line gradually decreased from the center toward the outside. Further in the pattern of the bright and dark lines of the first optically-anisotropic layer and the second optically-anisotropic layer, a state where the period decreased from the center toward the outside was observed.

<Preparation of Light Deflection Device>

A light deflection device was prepared using the same method as that of Example 2, except that the liquid crystal diffraction element was changed to the liquid crystal diffraction element including three optically-anisotropic layers of the first optically-anisotropic layer, the second optically-anisotropic layer, and the third optically-anisotropic layer.

[Evaluation]

Regarding the light deflection device according to Examples 3 and 4, the emission angle from the liquid crystal diffraction element was measured and evaluated using the same method as that of Example 1.

In the evaluation, likewise, it was verified that the deflection angle from the micromirror device was largely extended from an incidence angle range of −35° to 35° by the liquid crystal diffraction element, and the light was emitted at a deflection angle of about ±70°. In addition, in Example 3 rather than Example 2, or in Example 4, strong emitted light was obtained in a wider angle range.

In addition, in light deflection devices according to Examples 3 and 4, a larger amount of deflected light that in the light deflection device according to Example 1 was able to be emitted.

Other Examples

Further, light deflection devices were prepared by using the hologram sheet described in JP2016-184124A, a surface relief diffraction element including a relief pattern formed using the same method as that of a polymer banknote described in JP2015-093439A, and a diffraction element using fine patterning of an inorganic material described in JP2017-111277A as the diffraction element instead of the liquid crystal diffraction element. In the diffraction element, the periodic structure pitch gradually changed such that the diffraction angle gradually increased from the center of deflection (deflection orientation) from the liquid crystal optical phase modulation element toward both ends.

As a result, even in a case where any one of the diffraction elements was used, it was verified that the deflection angle from the liquid crystal optical phase modulation element was largely extended by the hologram sheet, the surface relief diffraction element, or the diffraction element using fine patterning of the inorganic material.

As described above, it was verified that the present invention can exhibit an effect of obtaining a light deflection device having a simple structure suitable for reducing the size and weight where a deflection angle can be increased.

INDUSTRIAL APPLICABILITY

The present invention is suitably applicable to various optical devices such as a distance-measuring sensor.

EXPLANATION OF REFERENCES

12: support
13: alignment film
14, 14A: optically-anisotropic layer
20: liquid crystal compound
22: optical axis
24: equiphase surface
50, 80: exposure device
52, 82: laser
54, 84: light source
56: beam splitter
58A, 58B, 90A, 90B: mirror
60A, 60B, 96, 111: $\lambda/4$ plate
70: laser light
72A, 72B: beam
86, 94: polarization beam splitter
92: lens
100: light deflection device
101: liquid crystal optical phase modulation element
101A: light deflection element
102: interval
103: incidence surface
110: optical device
112: light source
114: light-receiving element
121, 121A, 220, 224: liquid crystal diffraction element
131: collecting lens
132: MEMS light deflection element
134, 141: drive unit
151: incidence light
161: emission surface
171: arrow
201: first transparent substrate
203: second transparent substrate
207: director
209: alignment layer
211: composite electrode
213: common electrode
215: first optically-anisotropic layer
216: second optically-anisotropic layer

219: third optically-anisotropic layer
501: nematic liquid crystal layer
L: light
light $L_1$, $L_{41}$: incidence light
$L_2$, $L_{42}$, $L_{43}$; emitted light
$P_0$: linearly polarized light
$P_R$: right circularly polarized light
$P_L$: left circularly polarized light
M: laser light
MP: P polarized light
MS: S polarized light

What is claimed is:

1. A light deflection device comprising:
a light deflection element that deflects incident light to be emitted;
a driving unit that drives the light deflection element;
a liquid crystal diffraction element that is disposed on a light emission side of the light deflection element in which a periodic structure pitch gradually changes from a center of deflection from the light deflection element toward an outside,
a light collecting element that is provided upstream of the liquid crystal diffraction element in a light traveling direction,
wherein the periodic structure pitch of the liquid crystal diffraction element gradually decreases from the center of deflection from the light deflection element toward the outside, and
the light collecting element converts light emitted from the liquid crystal diffraction element into parallel light by reducing a diameter of light incident on the liquid crystal diffraction element.

2. The light deflection device according to claim 1,
wherein the light deflection element is a liquid crystal optical phase modulation element.

3. The light deflection device according to claim 1,
wherein the light deflection element is a MEMS light deflection element.

4. The light deflection device according to claim 1,
wherein the liquid crystal diffraction element includes an optically-anisotropic layer that is formed using a composition including a liquid crystal compound and has a liquid crystal alignment pattern in which a direction of an optical axis derived from the liquid crystal compound changes while continuously rotating in at least one in-plane direction, and
the liquid crystal alignment pattern of the optically-anisotropic layer is a concentric circular pattern having a concentric circular shape where the in-plane direction in which the direction of the optical axis derived from the liquid crystal compound changes while continuously rotating moves from an inside toward an outside.

5. The light deflection device according to claim 1, comprising:
a $\lambda/4$ plate.

6. The light deflection device according to claim 5,
wherein the $\lambda/4$ plate is provided between the light deflection element and the liquid crystal diffraction element.

7. The light deflection device according to claim 6,
wherein the light collecting element is provided upstream of the light deflection element in the light traveling direction.

8. An optical device comprising:
the light deflection device according to claim 1;
a light source that emits light to the light deflection element of the light deflection device; and
a light-receiving element.

* * * * *